(12) United States Patent
Yang et al.

(10) Patent No.: US 12,222,500 B2
(45) Date of Patent: Feb. 11, 2025

(54) STRUCTURED OPTICAL SURFACE AND OPTICAL IMAGING SYSTEM

(71) Applicant: 3M INNOVATIVE PROPERTIES COMPANY, St. Paul, MN (US)

(72) Inventors: Zhaohui Yang, North Oaks, MN (US); Brett J. Sitter, Cottage Grove, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 707 days.

(21) Appl. No.: 16/768,952

(22) PCT Filed: Dec. 18, 2018

(86) PCT No.: PCT/US2018/066207
§ 371 (c)(1),
(2) Date: Jun. 2, 2020

(87) PCT Pub. No.: WO2019/126151
PCT Pub. Date: Jun. 27, 2019

(65) Prior Publication Data
US 2020/0333601 A1    Oct. 22, 2020

Related U.S. Application Data

(60) Provisional application No. 62/608,299, filed on Dec. 20, 2017.

(51) Int. Cl.
*G02B 27/01* (2006.01)
*G02B 3/08* (2006.01)
*G02B 5/18* (2006.01)

(52) U.S. Cl.
CPC ........... *G02B 27/0172* (2013.01); *G02B 3/08* (2013.01); *G02B 5/188* (2013.01)

(58) Field of Classification Search
CPC ....... G02B 27/0172; G02B 3/08; G02B 5/188
See application file for complete search history.

(56) References Cited

U.S. PATENT DOCUMENTS 5,499,138 A * 3/1996 Iba ..................... G02B 3/0043
345/8
6,700,712 B2   3/2004 Servatius
(Continued)

FOREIGN PATENT DOCUMENTS

JP         2017199015         2/2017
WO    WO 2013-074325         5/2013
(Continued)

OTHER PUBLICATIONS

Sasian, "Diffractive Optical Elements Lens Design OPTI 517", College of Optical Sciences, 53 pages.
(Continued)

*Primary Examiner* — Lixi C Simpson
(74) *Attorney, Agent, or Firm* — Clifton F. Richardson

(57) ABSTRACT

A structured optical surface and an optical imaging system including the structured optical surface is described. The structured optical surface includes a plurality of structures formed by an intersection of at least first and second Fresnel patterns, such that when the structured optical surface is incorporated in an optical imaging system comprising a pixelated display surface with at least one pixel comprising at least two sub-pixels spaced apart by a gap, the structured optical surface images the at least two sub-pixels onto an image surface as at least two corresponding imaged sub-pixels spaced apart by a corresponding imaged gap, and the structured optical surface diffracts light so that the diffracted light at least partially fills the imaged gap without substantially overlapping any of the at least two imaged sub-pixels.

17 Claims, 18 Drawing Sheets

(56) References Cited

U.S. PATENT DOCUMENTS

| | | |
|---|---|---|
| 6,816,307 B1 | 11/2004 | Sun |
| 9,229,107 B2 | 1/2016 | Bell |
| 9,557,568 B1 | 1/2017 | Ouderkirk |
| 9,746,593 B2* | 8/2017 | Gill .................... G02B 5/1842 |
| 2003/0090813 A1* | 5/2003 | Servatius ................ G02B 3/08 |
| | | 359/742 |
| 2005/0030489 A1* | 2/2005 | Togino .................. G03B 21/60 |
| | | 353/74 |
| 2011/0058354 A1* | 3/2011 | Chen ........................ G02B 3/08 |
| | | 362/97.1 |
| 2016/0025978 A1 | 1/2016 | Mallinson |
| 2016/0070103 A1 | 3/2016 | Yoon |
| 2016/0127717 A1 | 5/2016 | Petrov |
| 2016/0349509 A1 | 12/2016 | Lanier |
| 2016/0353098 A1 | 12/2016 | Stein |
| 2017/0219824 A1 | 8/2017 | Kress |
| 2017/0242262 A1 | 8/2017 | Fuchs |
| 2017/0285347 A1* | 10/2017 | Cai .................... G02B 27/0176 |
| 2019/0101767 A1* | 4/2019 | Geng ................ G02B 27/0172 |

FOREIGN PATENT DOCUMENTS

| | | |
|---|---|---|
| WO | WO 2015-191339 | 12/2015 |
| WO | WO 2017-002278 | 1/2017 |
| WO | WO 2017-139245 | 8/2017 |

OTHER PUBLICATIONS

Selvanandan, "Power Coupling Efficiency Enhancement in Multimode Step-Index Fiber Using Refractive and Diffractive Microlenses", International Journal of Optics, Dec. 2010, pp. 1-7.

International Search Report for PCT International Application No. PCT/US2018/066207, mailed on May 9, 2019, 4 pages.

* cited by examiner

STRUCTURED OPTICAL SURFACE AND OPTICAL IMAGING SYSTEM

BACKGROUND

Pixelated displays typically have gaps between adjacent pixels and sub-pixels. In some cases, these gaps result in optical artifacts known as the screen-door effect which may be objectionable to viewers.

SUMMARY

In some aspects of the present description, a structured optical surface is provided. The structured optical surface includes a plurality of three-dimensional structures formed by an intersection of at least first and second Fresnel patterns such that when the structured optical surface is incorporated in an optical imaging system comprising a pixelated display surface with at least one pixel comprising at least two sub-pixels spaced apart by a gap, the structured optical surface images the at least two sub-pixels onto an image surface as at least two corresponding imaged sub-pixels spaced apart by a corresponding imaged gap, and the structured optical surface diffracts light so that the diffracted light at least partially fills the imaged gap without substantially overlapping any of the at least two imaged sub-pixels.

In some aspects of the present description, a structured optical surface is provided. The structured optical surface includes a plurality of structures such that for normally incident light having a wavelength in a visible range of the electromagnetic spectrum, the structured optical surface substantially diffracts a first portion of the incident light into a plurality of diffraction orders propagating in a corresponding plurality of different directions, and substantially refracts a different second portion of the incident light so that the substantially refracted light makes an oblique angle with the structured optical surface.

In some aspects of the present description, a structured optical surface is provided. The structured optical surface includes a plurality of structures such that for normally incident light having a wavelength in a visible range of the electromagnetic spectrum, the structured optical surface transmits the incident light as transmitted light having a first portion propagating along a plurality of directions not sufficiently described using geometric optics and a second portion propagating in directions sufficiently described using geometric optics, the directions of the second portion making oblique angles with the structured optical surface.

In some aspects of the present description, an optical imaging system is provided. The optical imaging system includes a pixelated display surface for displaying an image and comprising a plurality of pixels comprising a plurality of sub-pixels separated by a plurality of gaps. The optical imaging system includes a hybrid refractive and diffractive optical surface imaging the pluralities of sub-pixels and the gaps onto an image surface of the optical imaging system as a plurality of imaged sub-pixels separated by a plurality of imaged gaps, and diffracting light from the display surface so that the diffracted light at least partially fills the plurality of imaged gaps without substantially overlapping any of the imaged sub-pixels.

DETAILED DESCRIPTION

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

Display devices typically include a two-dimensionally pixelated display. In some cases, the spaces between the pixels or sub-pixels are visible to a viewer and this may be objectionable, particularly in head-mounted displays in which an optical system magnifies a displayed image for viewing by a viewer. This is known as the screen-door effect or fixed-pattern noise. According to some embodiments of the present description, structured optical surfaces which can be used for reducing the screen-door effect of a display are provided. The structured optical surfaces can be used for other applications depending on the geometry of the structures. In some embodiments, the structured optical surface images at least two sub-pixels onto an image surface as corresponding imaged sub-pixels spaced apart by a corresponding imaged gap and the structured optical surface diffracts light so that the diffracted light at least partially fills the imaged gap. At least partially filling the imaged gap has been found to reduce the screen-door effect. In some embodiments, a single structured optical surface can be used to provide both refraction and diffractive optical power. Such a hybrid refractive and diffractive optical surface can image pluralities of sub-pixels and gaps therebetween of a display surface onto an image surface as a plurality of imaged sub-pixels separated by a plurality of imaged gaps, and can diffract light from the display surface so that the diffracted light at least partially fills the plurality of imaged gaps without substantially overlapping any of the imaged sub-pixels.

Figure 1:
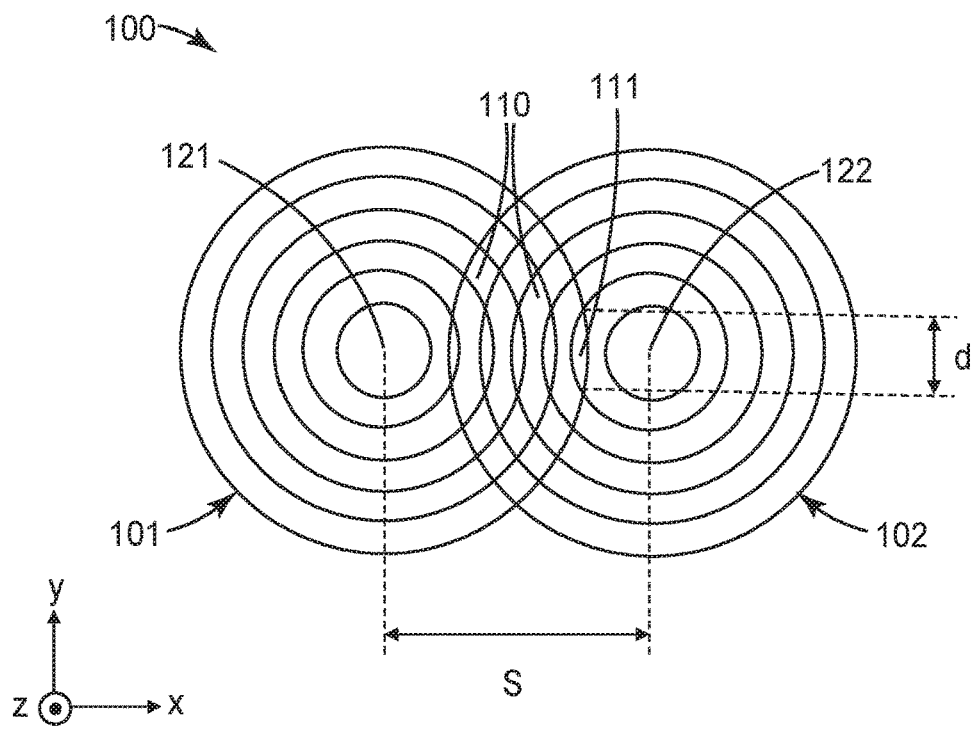
FIGS. 1-2 are schematic top views of structured optical surfaces.

FIG. 1 is a schematic top view of a structured optical surface 100 which includes a plurality of three-dimensional structures 110 formed by an intersection of first and second Fresnel patterns 101 and 102. The Fresnel patterns 101 and 102 may have a same spacing of Fresnel segments or the spacing may be different for different Fresnel patterns. The spacing of Fresnel segments within a Fresnel pattern may be uniform or non-uniform. In some embodiments, more than two Fresnel patterns 101 and 102 are included (see, e.g., FIG. 2 described further elsewhere herein). In some embodiments, the plurality of the three-dimensional structures 110 are formed by an intersection of between two and sixteen Fresnel patterns. For example, at least 2, or at least 3, or at least 4, or at least 5, or at least 6 Fresnel patterns; and no more than 16, or no more than 14, or no more than 12, or no more than 10 Fresnel patterns. It has been found that at least two, or at least 3, or at least 4, or at least 5, or at least 6 Fresnel patterns is preferred for reducing the screen-door effect. It has been found that using no more than 16, or no more than 14, or no more than 12 Fresnel patterns, or no more than 10 Fresnel patterns is preferred for maintaining a low level of scattering.

The first Fresnel pattern 101 has a first center 121 and the second Fresnel pattern 102 has a second center 122 spaced apart from the first center 121 by the distance S. In some embodiments, S is in a range from about 1 millimeter to about 20 millimeters. The distance S can be selected to produce a desired lateral shift of a focus so that some light from a pixelated display that passes through the structured optical surface is focused in gap regions between sub-pixels of the pixelated display. This lateral shift in focus, Δs, for an imaging system including the structured optical surface is related to the equivalent focusing distance, f, of the imaging system, and the focal length, fl, of the spherical component of the imaging system as $\Delta s = S(fl-f)/f$.

In some embodiments, the distance S is selected so that light is diffracted into imaged gaps between imaged sub-pixels in order to reduce the screen-door effect. The effect of the structured optical surface can be characterized in terms of the optical transfer function (OTF) and/or the point spread function (PSF) of the structured optical surface. The Fourier transform of an image of a pixelated display surface typically shows a center point (near zero wavevector) representing the zeroth order harmonic and additional points representing the higher order harmonics. These higher order harmonics are responsible for the screen-door effect. The structured optical surface can be selected to reduce these higher order harmonics by choosing S to fill in the gaps between sub-pixels. The OTF of the structured optical surface then exhibits dark fringes which suppress the higher order harmonics. The PSF of the structured optical surface typically shows peaks corresponding to light focused to the imaged sub-pixel and diffracted into the gap between sub-pixels. The PSF in regions between the peaks represent scattering which is typically not desired. In some cases, a larger number of intersecting Fresnel patterns provides an OTF which is more effective in reducing the screen-door effect, but may also produce a PSF with larger intensity between peaks indicating increased scattering. For this reason, it is typically preferred to include 2 to 16, or 4 to 14, or 6 to 12, or 6 to 10 intersecting Fresnel patterns.

The screen-door effect can be characterized by a screen-door effect index (SDEI), which can be determined by calculating the Fourier transform of the light output from a pixelated display surface when each of the sub-pixels of each primary color are illuminated. For each illuminated color, the ratio of the maximum higher order spatial frequency power of the Fourier transform to the zeroth order spatial frequency power is determined with any component having less than 0.5% of the total power considered to be noise and discarded. The SDEI is calculated as 100 times the weighted average of the ratios determined for each color where the weighting is determined by the fractional power output for the color. It is typically desired for the SDEI to be low (e.g., less than about 2, or less than about 1, or less than about 0.5).

The three-dimensional structures 110 may have a wide range of length scales. One length scale of the structures is the maximum lateral dimension which is the largest dimension of the structure in the major plane (the x-y plane referring to the x-y-z coordinate system of FIG. 1. For example, three-dimensional structure 111 has a maximum lateral dimension of d. In some embodiments, at least one three-dimensional structure in the plurality of three-dimensional structures 110 has a maximum lateral dimension in a range from about 10 millimeters to about 100 millimeters. In some embodiments, at least one three-dimensional structure in the plurality of three-dimensional structures 110 has at least one length scale (e.g., a maximum lateral width orthogonal to the maximum lateral dimension) substantially smaller than 10 millimeters. For example, in some embodiments, at least one three-dimensional structure in the plurality of three-dimensional structures 110 has at least one length scale in a range from about 0.1 micrometers to about 1 millimeter, or to about 100 micrometers.

Figure 2:
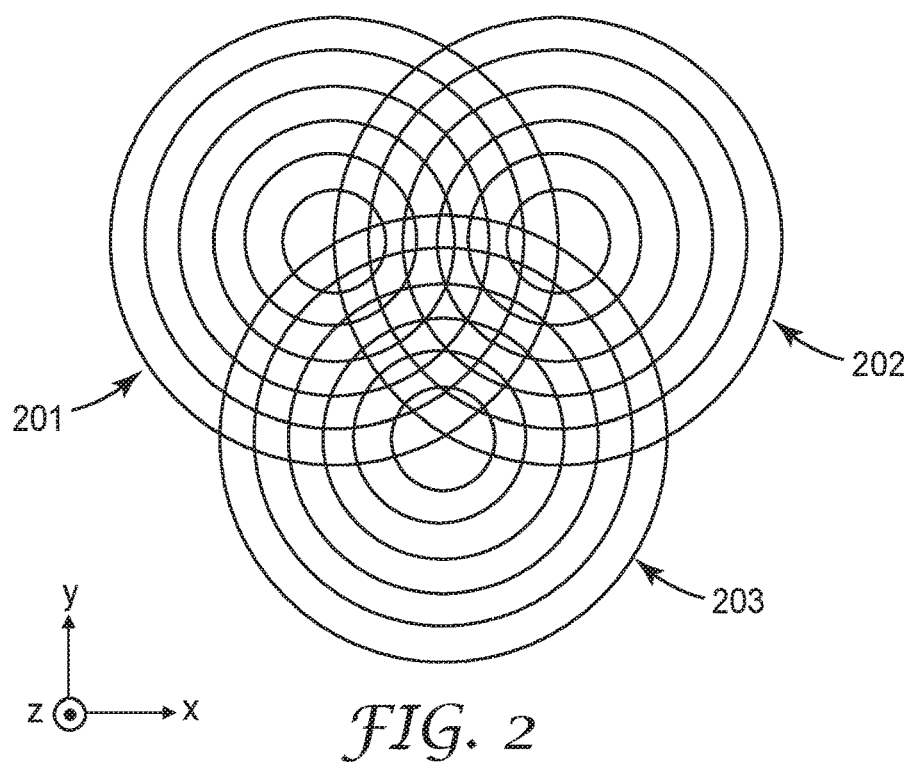

FIG. 2 is s a schematic top view of a structured optical surface 200 formed by an intersection of first, second and third Fresnel patterns 201, 202 and 203. In some embodiments, a structured optical surface formed by an intersection of n optical elements, has an n-fold symmetry. A surface symmetric under rotations of 360 degrees/n about an axis normal to the major plane of the surface, where n in an integer greater than 1, can be said to have an n-fold symmetry. For example, the structured optical surface 200 has a 3-fold symmetry since is symmetric under rotations of 120 degrees about an axis parallel to the z-axis (referring to the x-y-z coordinate system of FIG. 2) and passing through a center point of the three Fresnel patterns. The center-to-center spacing between the Fresnel patterns may be as described elsewhere herein for structured optical surface 100.

Figure 19:
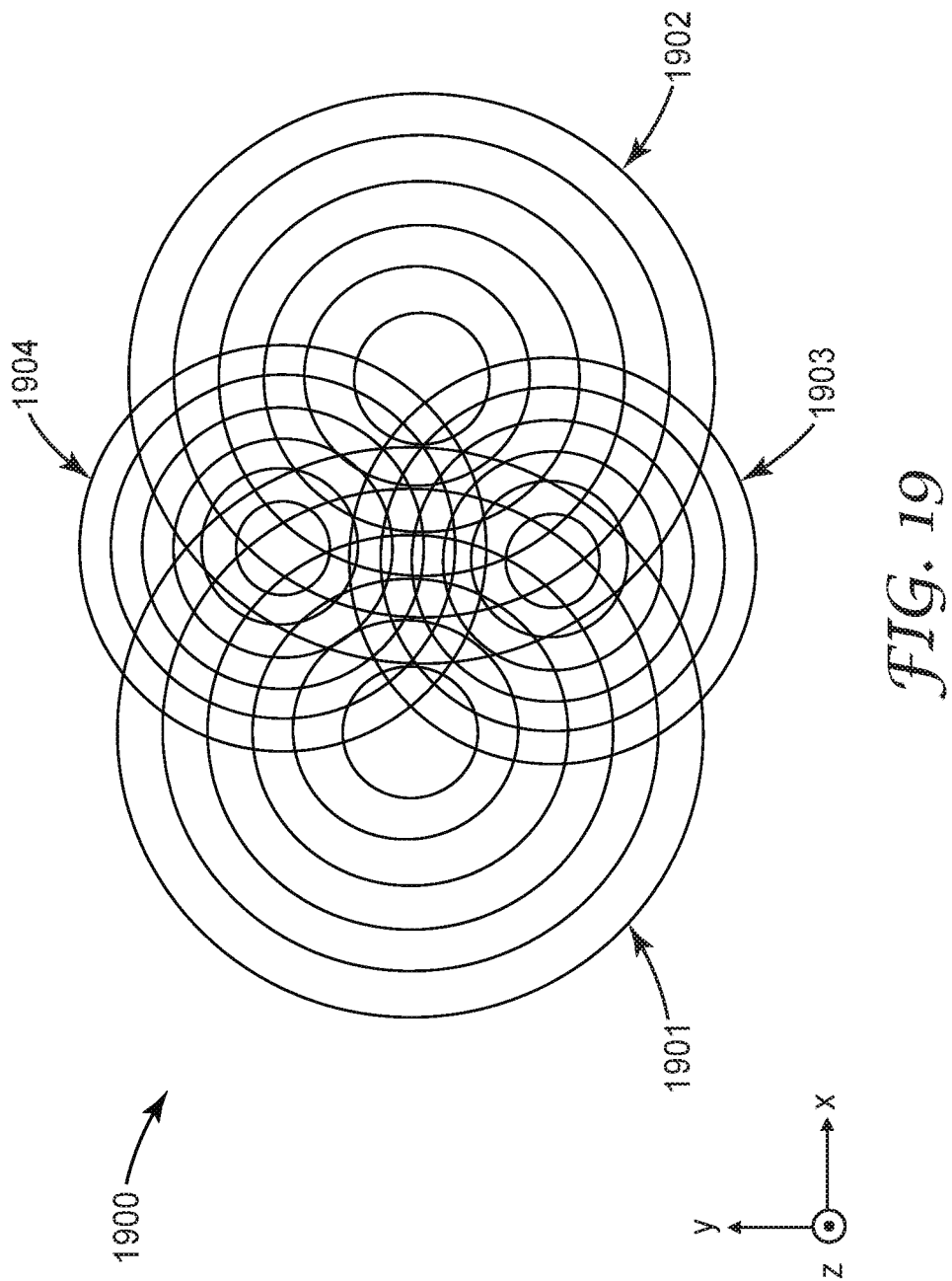
FIG. 19 is a schematic top view of a structured optical surface.

In some embodiments, a structured optical surface has an n-fold symmetry, where $2 \leq n \leq 16$. In some embodiments, n is greater than or equal to 2, or 3, or 4, or 5, or 6. In some embodiments, n is less than or equal to 16, or 14, or 12, or 10. A structured optical surface having an n-fold symmetry can be constructed from the intersection of n Fresnel patterns or other optical elements may be used. The Fresnel patterns may be the same pattern (e.g., same spacing between concentric rings) or different patterns may be used. For example, each of the Fresnel patterns 201, 202 and 203 may be the same pattern (i.e., the same geometry other than the position of a center point of the pattern) or at least one of the Fresnel patterns may be different from at least one other of the Fresnel patterns (e.g., different spacing). In some embodiments, the intersection of n Fresnel patterns is not n-fold symmetric. For example, in some embodiments, the intersecting Fresnel patterns may differ in some way (e.g., size or spacing of elements) so that the arrangement of the Fresnel patterns does not have rotational symmetries, or has a reduced rotation symmetry so than m intersecting Fresnel patterns has an n-fold symmetry with m>n. For example, 4 Fresnel patterns may intersect with opposing pairs of the Fresnel patterns being symmetric with each other but not with the other Fresnel patterns to provide a structured optical surface with a 2-fold symmetry. This is illustrated in FIG. 19 which is a schematic top view of a structured optical surface 1900 including four Fresnel patterns. First and second Fresnel patterns 1901 and 1902 are a same pattern (e.g., same spacing of segments) and third and fourth Fresnel patterns 1903 and 1904 are a same pattern (e.g., same spacing of segments). First Fresnel pattern 1901 and third Fresnel pattern 1903, for example, are different patterns (e.g., different spacing of segments). The structured optical surface 1900 has a 2-fold symmetry. In some embodiments, there may be no rotational symmetry for rotations less than 360 degrees (e.g., the Fresnel patterns may be randomly placed). It is typically preferred that the number of Fresnel patterns and any symmetry breaking due to using different Fresnel patterns be selected to produce between 2 and 16 virtual sub-pixels in order to reduce the screen-door effect without producing substantial undesired scattering.

The structured optical surface may be provided on a major surface of a substrate such as a polymer film or a glass. The structured optical surface can be made by any suitable method such as lithography or diamond turning, for example. For example, lithography (e.g., photo-lithography or e-beam lithography) can be used to write Fresnel lens elements into a photoresist. In one method, a single Fresnel lens element can be written first on a substrate. After the first Fresnel lens element is generated, the lithography process can be shifted to generate the remaining fold(s) of symmetries. Similarly, diamond turning can be used to make 1-fold, and then the substrate can be turned to make multiple-fold symmetries. In another lithography method, the complete Fresnel pattern with multi-fold symmetry can be written at once with a single gray scale mask or write field. In some embodiments, a master piece is generated via photolithography or diamond turning and then slave pieces are made by micro-replication.

Figure 3A:
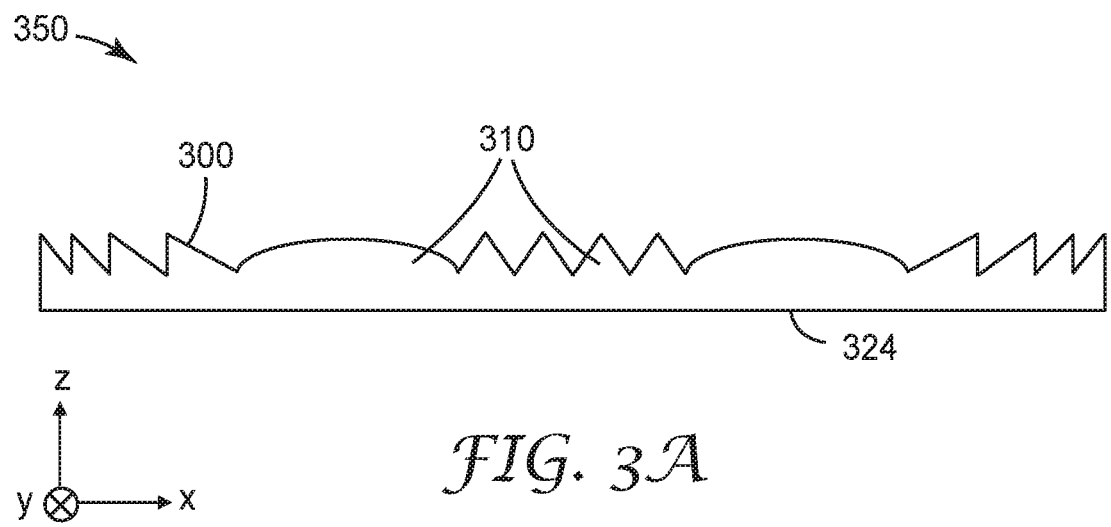
FIGS. 3A-3B are schematic cross-sectional views of an optical element having a structured optical surface.

FIG. 3A is schematic cross-sectional view of an optical element 350 having a structured optical surface 300 including a plurality of structures 310 formed by an intersection of at least first and second Fresnel patterns. The optical element 350 has a substantially planar major surface 324 opposite the structured optical surface 300. In other embodiments, the opposite major surface 324 is structured or curved. A substantially planar surface of an optical element can be understood to refer to a surface having a radius of curvature of greater than 10 times a largest lateral dimension of the optical element. A substantially planar surface may be planar, or may be nominally planar but may differ from being precisely planar due to ordinary manufacturing variations, for example.

In some embodiments, a structured optical surface includes a plurality of structures adapted to both diffract and refract incident light. The structures may be Fresnel structures or other structures incorporating a range of length scales may be used. In some embodiments, the structured optical surface is adapted such that for normally incident light, some portion of the light will follow the path predicted by classical geometric optics and some portion of the light will substantially deviate from the prediction of classical geometric optics due to diffraction. The portion of light following, or substantially following, paths described using geometric optics will be referred to herein as a substantially refracted portion of the light and the portion of the light deviating substantially from paths described using geometric optics will be referred to herein as a substantially diffracted portion. In some embodiments, a structured optical surface includes a plurality of structures, such that for normally incident light having a wavelength in a visible range of the electromagnetic spectrum (e.g., in a range of 400 nm to 700 nm), the structured optical surface substantially diffracts a first portion of the incident light into a plurality of diffraction orders propagating in a corresponding plurality of different directions, and substantially refracts a different second portion of the incident light so that the substantially refracted light makes an oblique angle with the structured optical surface. A structured optical surface which both substantially refracts and substantially diffracts incident light may be referred to as a hybrid refractive and diffractive optical surface.

Figure 3B:
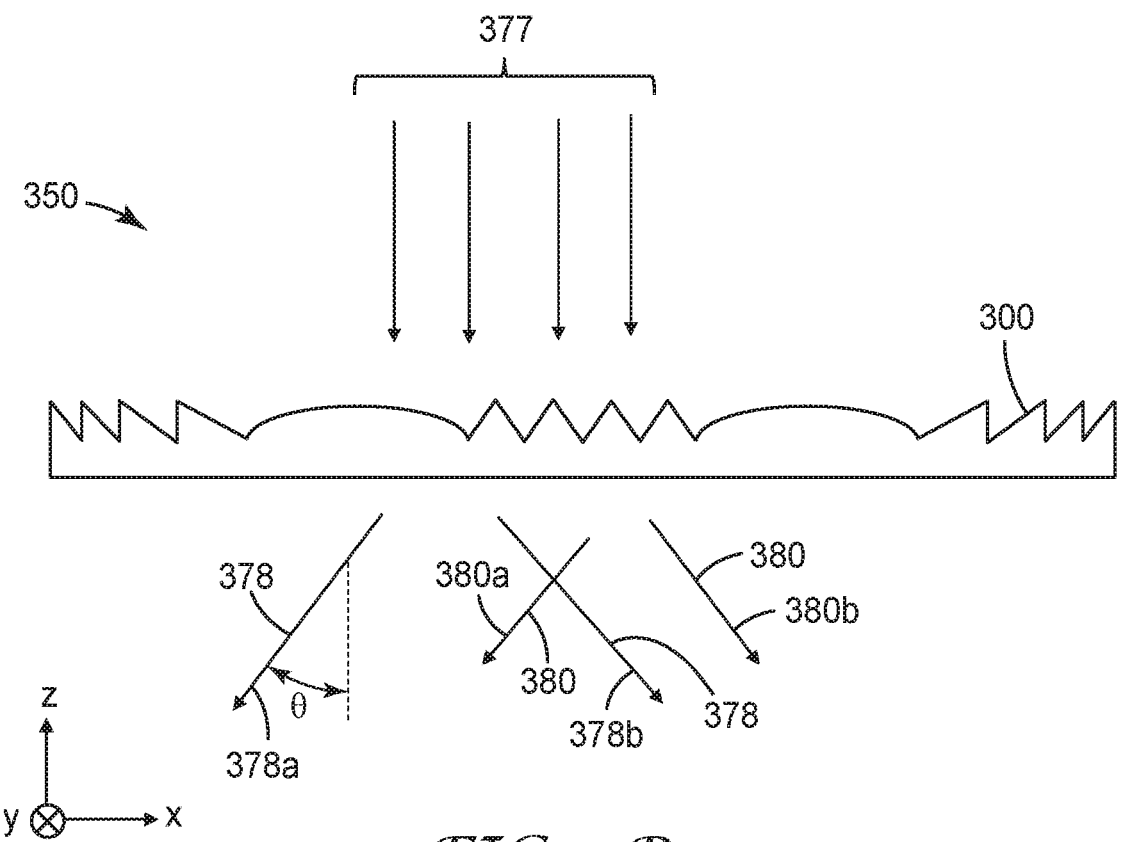

FIG. 3B is a schematic cross-sectional view of the optical element 350 illustrating light 377 normally incident on the structured optical surface 300 relative to a major plane (parallel to x-y plane) of the structured optical surface 300. Light 377 has a wavelength in a visible range of the electromagnetic spectrum (e.g., about 550 nm). The structured optical surface 300 substantially diffracts a first portion 380 of the incident light 377 into a plurality of diffraction orders propagating in a corresponding plurality of different directions 380a and 380b, and substantially refracts a different second portion 378 of the incident light 377 so that the substantially refracted light 378a and 378b makes an oblique angle ($\theta$ for light 378a) with the structured optical surface. The substantially refracted light can be identified by determining the optical paths of incident light 377 using classical geometrical optics. Exiting light that propagates along optical directions that can be sufficiently described using geometric optics is substantially refracted as the term is used herein. For example, light 378a and 378b exit along paths that can be predicted by following the optical path of incident light rays in light 377 using classical geometrical optics calculations. Exiting light that propagates along directions not sufficiently described using geometric optics is substantially diffracted as the term is used herein. For example, first portion 380 of incident light 377 exits along directions 380a and 380b that deviate from the prediction of geometrical optics for any of the light rays in incident light 377. The structured optical surface 300 transmits the incident light 377 as transmitted light having a second portion 378 propagating along directions sufficiently described by geometric optics and a first portion 380 propagating in a plurality of different directions not sufficiently described by geometric optics.

Light propagating along directions deviating from the prediction of geometric optics by more than a predetermined angle can be described as substantially deviating from the prediction of geometric optics or can be described as being not sufficiently described by geometrical optics. Light propagating along directions within the predetermined angle of the prediction of geometrical optics can be sufficiently described using geometric optics. The predetermined angle may depend on the application (e.g., on the spacing between sub-pixels and distance between the structured optical surface and the pixelated display surface) and the size of the structures in the structured optical surface. In some cases, the predetermined angle is about 0.05 degrees, or about 0.03 degrees, or about 0.02 degrees, or about 0.01 degrees. It will be understood that any light passing through the structured optical surface 300 undergoes both diffraction and refraction and it is not necessary for any light ray to undergo only refraction or only diffraction separately in order to distinguish between substantially refracted and substantially diffracted light. Rather, substantially refracted and substantially diffracted light can be distinguished by the paths of the exiting light. Similarly, it is not necessary to identify specific diffraction orders to determine that light has been diffracted into a plurality of different diffraction orders propagating in a corresponding plurality of different directions since this can be inferred from the paths of the exiting light.

Figure 4A:
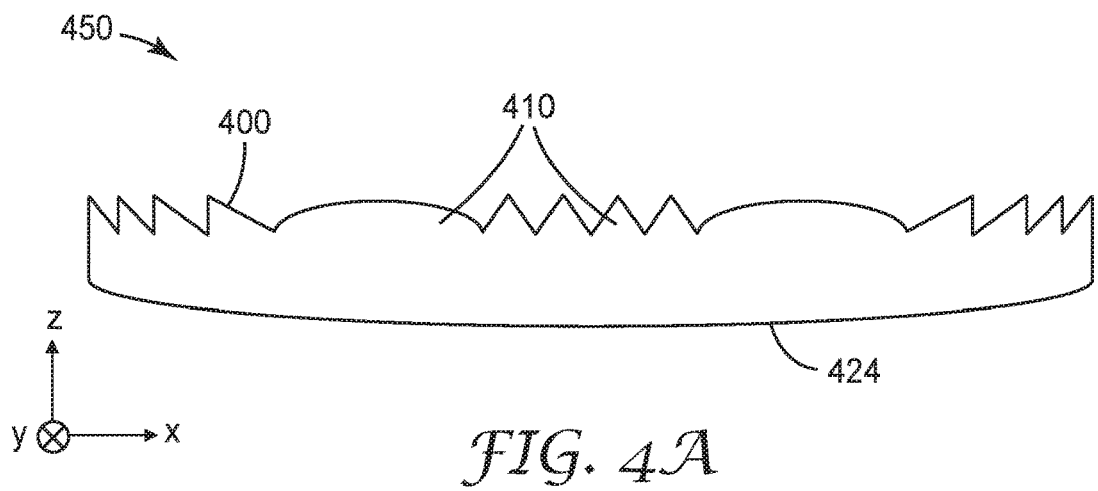
FIG. 4A-4C are schematic cross-sectional views of optical elements having a structured optical surface and an opposing optical surface.

FIG. 4A is a schematic cross-sectional view of an optical element 450 having a structured optical surface 400 including a plurality of structures 410 formed by an intersection of at least first and second Fresnel patterns. The optical element 450 has a curved major surface 424 opposite the structured optical surface 400. Structured optical surface 400 may be as described for structured optical surface 300. Depending on the orientation of the optical element 450 relative to a light source (e.g., pixelated display), light substantially refracted or substantially diffracted by structured optical surface 400 may then be refracted by curved major surface 424, or light refracted by curved major surface 424 may then be substantially refracted or substantially diffracted by structured optical surface 400.

Figure 4B:
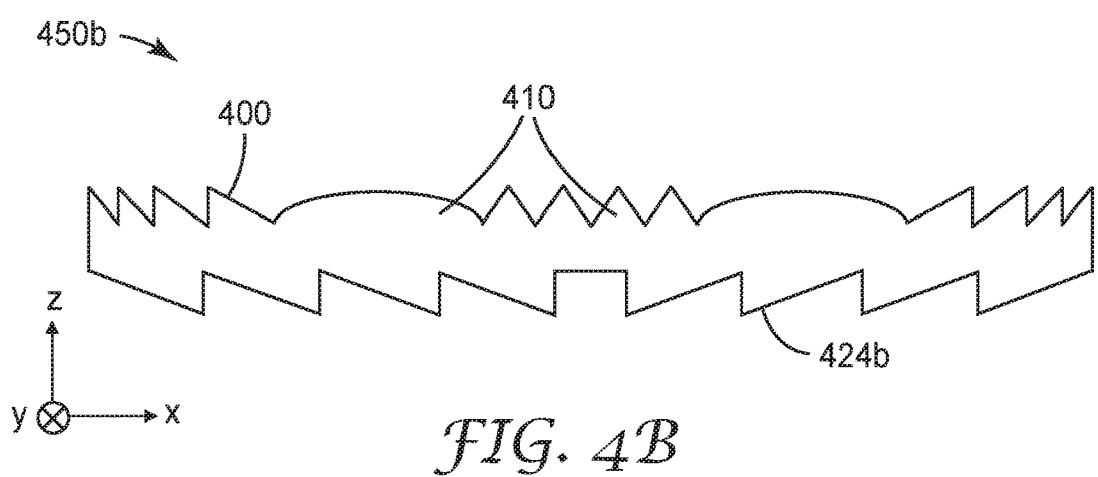

An alternative embodiment is schematically illustrated in FIG. 4B which is a schematic cross-sectional view of an optical element 450b having the structured optical surface 400 and having an opposing structured optical surface 424b. In some embodiments, the opposing structured optical surface 424b includes one or more Fresnel patterns. For example, the curved major surface 424 of FIG. 4A may be replaced with a Fresnel pattern. In some embodiments, the opposing structured optical surface 424b includes a plurality of intersecting Fresnel patterns.

Figure 4C:
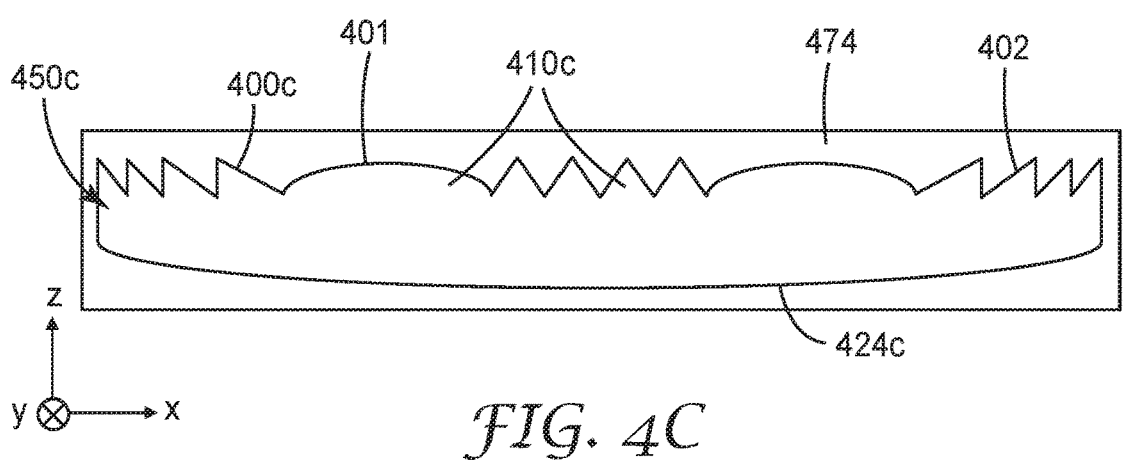

An alternative embodiment is schematically illustrated in FIG. 4C which is a schematic cross-sectional view of an optical element 450c having the structured optical surface 400c including three-dimension structures 410c formed by the intersection of different first and second Fresnel patterns 401 and 402. The optical element 450c has an opposing curved optical surface 424c. The optical element 450c is immersed in a material 474 which may be a resin or an optically clear adhesive, for example. An optically clear adhesive, or an optically clear resin, may have a transmittance throughout the visible range (400 nm-700 nm) of at least 90% and may have a haze of less than 5%.

In some embodiments, an optical imaging system includes a plurality of optical lenses which may be disposed proximate a structured optical surface of the present description. For example, one or more optical lenses may be disposed adjacent one or both of the major surfaces of optical element 350 or 450. In some embodiments, utilizing a curved major surface 424 of the optical element 450 allows fewer additional optical lenses to be used in the optical imaging system. In some embodiments, an optical element including a structured optical surface is immersed in a resin or an optically clear material and one or more optical lenses is also immersed in the resin to provide a compound optical element including the structured optical surface and one or more optical lenses.

Figure 5:
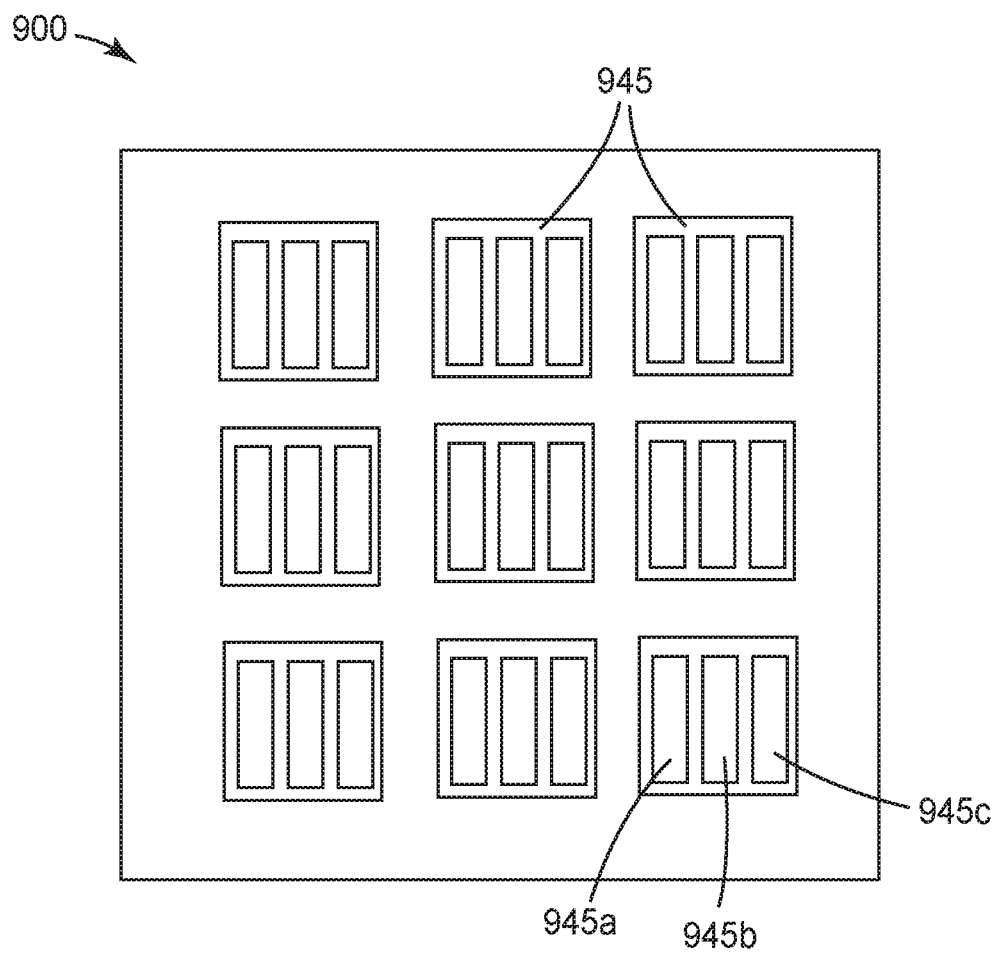
FIG. 5 is a schematic top view of a pixelated display surface.

FIG. 5 is a schematic illustration of a pixelated display surface 900 for displaying an image. The display surface 900 includes a plurality of pixels 945 comprising a plurality of sub-pixels separated by a plurality of gaps. Each of the pixels 945 typically includes three or more sub-pixels which allow a desired color to be produce by each pixel 945. For example, the illustrated sub-pixels 945a, 945b and 945c may be blue, green and red sub-pixels which can have output levels adjustable to provide a desired color and a desired intensity. Additional sub-pixels (e.g., yellow) may be included in some embodiments. The pixel and sub-pixel arrangement can be similar to or different from that schematically illustrated in FIG. 5. For example, a triangular pattern, striped pattern, diagonal pattern, or a PENTILE matrix can be used as is known in the art. In the case of a PENTILE matrix which includes red and green pairs of sub-pixels and green and blue pairs of sub-pixels, for example, each pixel can be understood to include a red and green pair and a green and blue pair, so that each pixel includes four sub-pixels. In some embodiments, an organic light emitting diode (OLED) display is used and the sub-pixels 945a, 945b and 945c include emissive layers which are used as the light source for the display. In some embodiments, a liquid crystal display (LCD) is used and a separate light source is used to provide a light input into a backlight of the LCD display and the pixels and sub-pixels are formed by the LCD panel.

Figure 6A:
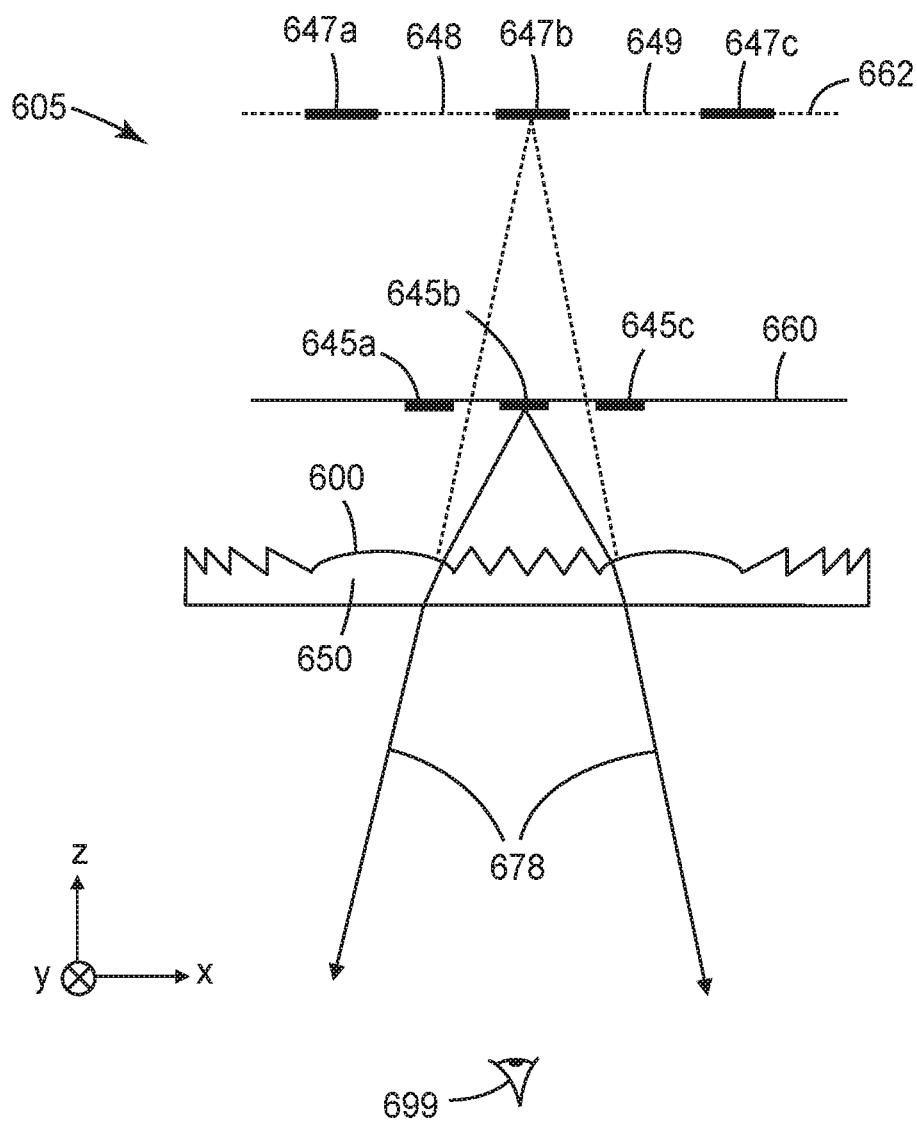
FIGS. 6A-6B are schematic cross-sectional views of an optical imaging system.

FIG. 6A is a schematic cross-sectional view of an optical imaging system 605. A pixilated display surface 660 is schematically illustrated. The pixelated display surface may correspond to the display surface 900, for example. A pixel having three sub-pixels 645a, 645b, and 645c separated by gaps is illustrated. More generally, the pixelated display surface 660 includes at least one pixel comprising at least two sub-pixels spaced apart by a gap. Typically, a plurality of pixels is included in order to provide a pixelated image. However, in other embodiments a single pixel may be used. For example, to provide an indicator, the single pixel, or each pixel in a plurality of pixels, may have only two sub-pixels (e.g., if only two indicator colors are needed) or may have three or more sub-pixels.

A structured optical surface 600 is disposed proximate the display surface 660. The optical imaging system 605 may include optical lenses adjacent to the optical element 650. In some embodiments, the optical element 650 is disposed closer to the optical lenses than to the display surface 660. The structured optical surface 600 images the sub-pixels onto an image surface 662 as corresponding imaged sub-pixels spaced apart by a corresponding imaged gap. Sub-pixels 645a, 645b and 645c are imaged as corresponding imaged sub-pixels 647a, 647b and 647c, respectively. The gap between sub-pixels 645a and 645b is imaged as imaged gap 648 and the gap between sub-pixels 645b and 645c is imaged as imaged gap 649.

Figure 6B:
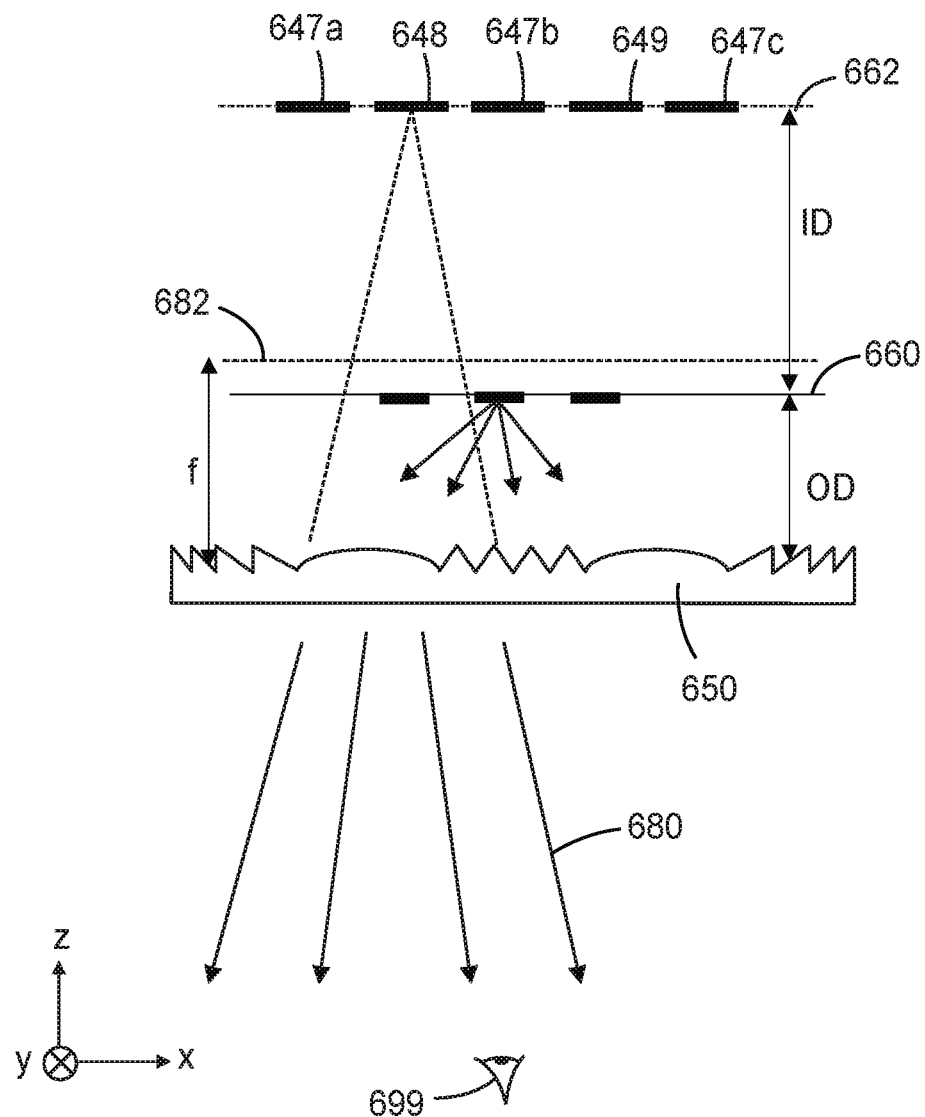

The optical imaging system 605 may be configured to provide virtual or real images of the sub-pixels and gaps. In the illustrated embodiment, the imaged sub-pixels and the imaged gap are virtual images. Light 678 which forms a virtual image on the image surface 662 is illustrated in FIG. 6A. FIG. 6B is a schematic cross-sectional view of the optical imaging system 605 illustrating light 680 which is diffracted by structured optical surface 600. The structured optical surface 600 is configured to diffract light so that the diffracted light at least partially fills the imaged gap between sub-pixels without substantially overlapping any of the imaged sub-pixels. For example, light 680 is diffracted into the imaged gap 648 between imaged sub-pixels 647a and 647b. In the illustrated embodiment, light 680 virtually partially fills the imaged gap 648. That is, the light 680 appears to viewer 699 as originating from imaged gap 648.

The focal length f of the structured optical surface 600 to the focal surface 682, the object distance OD of the optical imaging system 605, and the image distance ID of the optical imaging system 605 are indicated in FIG. 6B. These distances are related by $1/f=1/OD-1/ID$. In some embodiments, ID is very large (e.g., in head-mounted display applications, it may be desired for the image surface 662 to be nominally at infinity), so that f OD and so the focal surface 682 is close to or substantially coincident with the display surface 660. In some embodiments, the structured optical surface 600 has optical power in orthogonal first and second directions (e.g., x- and y-directions). In some embodiments, the optical power is the same or about the same in the first and second directions so that the focal surface 682 is planar or substantially planar.

In the illustrated embodiment, an optical element 650 includes the structured optical surface 600. The optical element 650 may be disposed with the structured optical surface 600 facing towards the display surface 660 as illustrated, or the optical element may be disposed with the structured optical surface 600 facing away from the display surface 660. The optical element 650 may be as described for optical element 350 or 450, for example. The optical imaging system 605 may further include additional optical elements which may include refractive optical elements (e.g., optical lenses) and/or components configured to provide a folded optical path as described in U.S. Pat. No. 9,557,568 (Ouderkirk et al.).

Diffracted light partially filling the imaged gap without substantially overlapping any of the imaged sub-pixels means that the average intensity of light that is diffracted but not focused onto any imaged sub-pixel is less than 25% of the average intensity of light focused onto the imaged sub-pixel. The average intensity refers to the average of the intensity over the imaged sub-pixel, which is the power of the light appearing to originate from the imaged sub-pixel from the perspective of the viewer 699. In some embodiments, the average intensity of light that is diffracted but not focused onto an imaged sub-pixel is less than 20%, or less than 15%, or less than 10%, or less than 5% of the average intensity of light focused onto the imaged sub-pixel. In some embodiments, the average intensity of light from a first sub-pixel that is diffracted onto any imaged sub-pixel corresponding to a different second sub-pixel is less than 25% of the average intensity of the imaged sub-pixel corresponding to the second sub-pixel. In some embodiments, the average intensity of light from a first sub-pixel that is diffracted onto an imaged sub-pixel corresponding to a different second sub-pixel is less than 20%, or less than 15%, or less than 10%, or less than 5% of the average intensity of the imaged sub-pixel corresponding to the second sub-pixel.

Figure 7A:
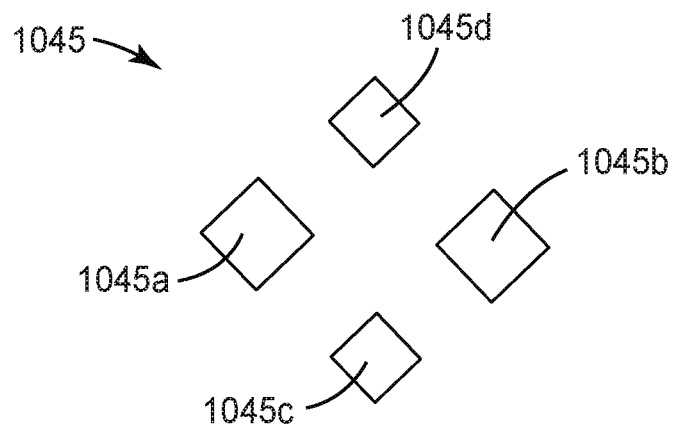
FIG. 7A is a schematic top view of a pixel.
Figure 7B:
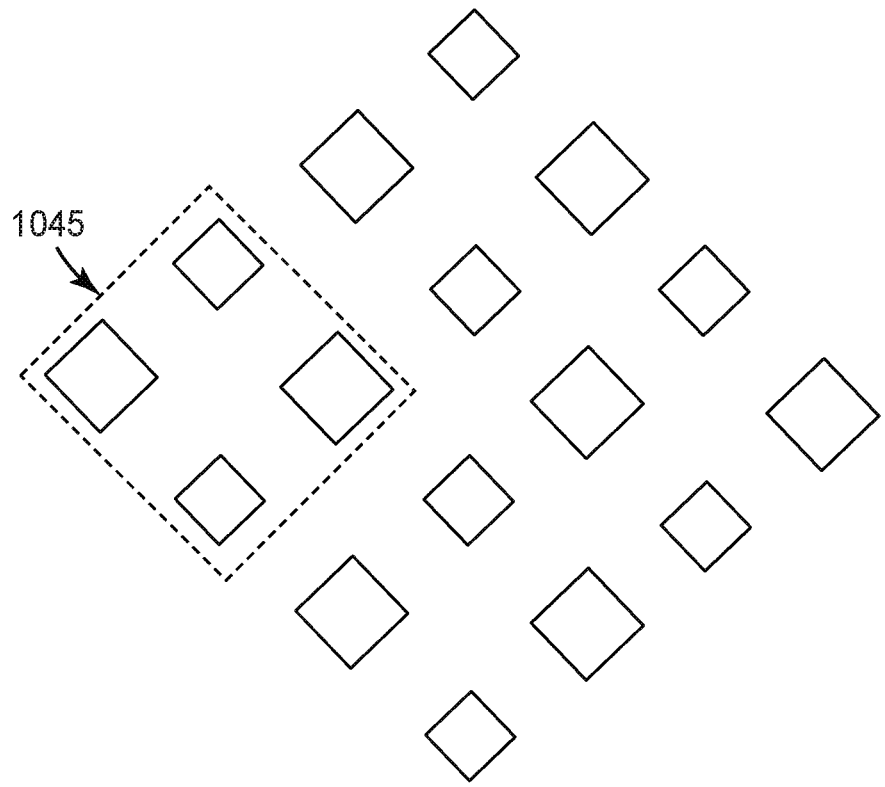
FIG. 7B is a schematic top view of an array of the pixel of FIG. 7A.
Figure 7C:
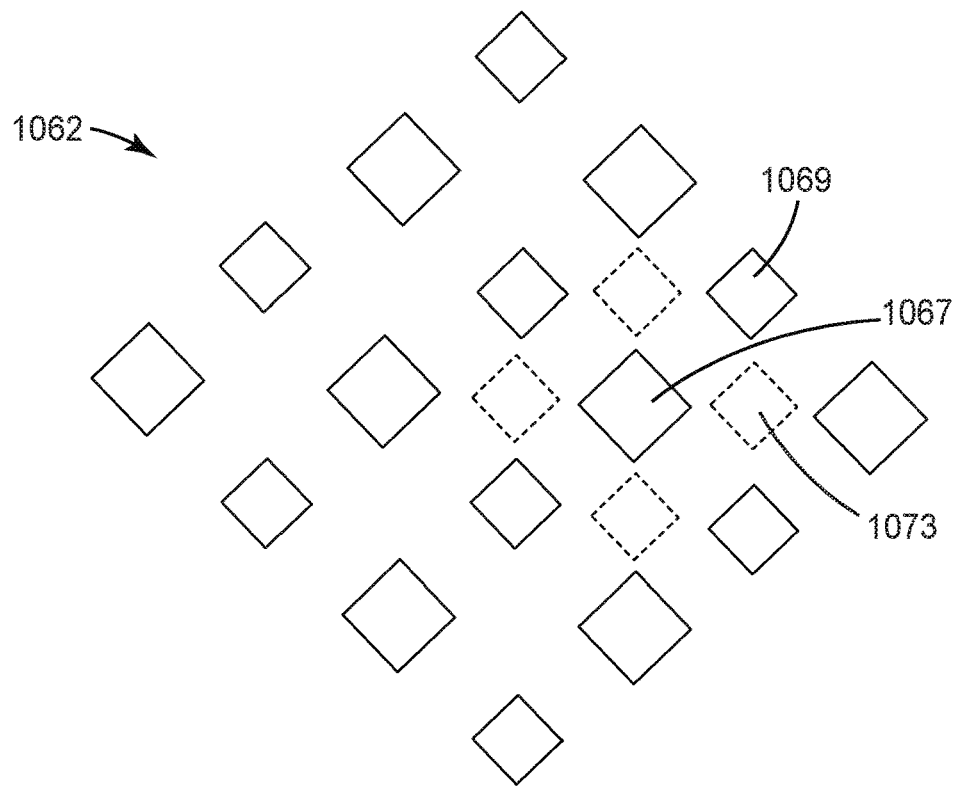
FIGS. 7C-7E are schematic top views of imaged arrays of the pixel of FIG. 7A produced by structured optical surfaces.
Figure 7D:
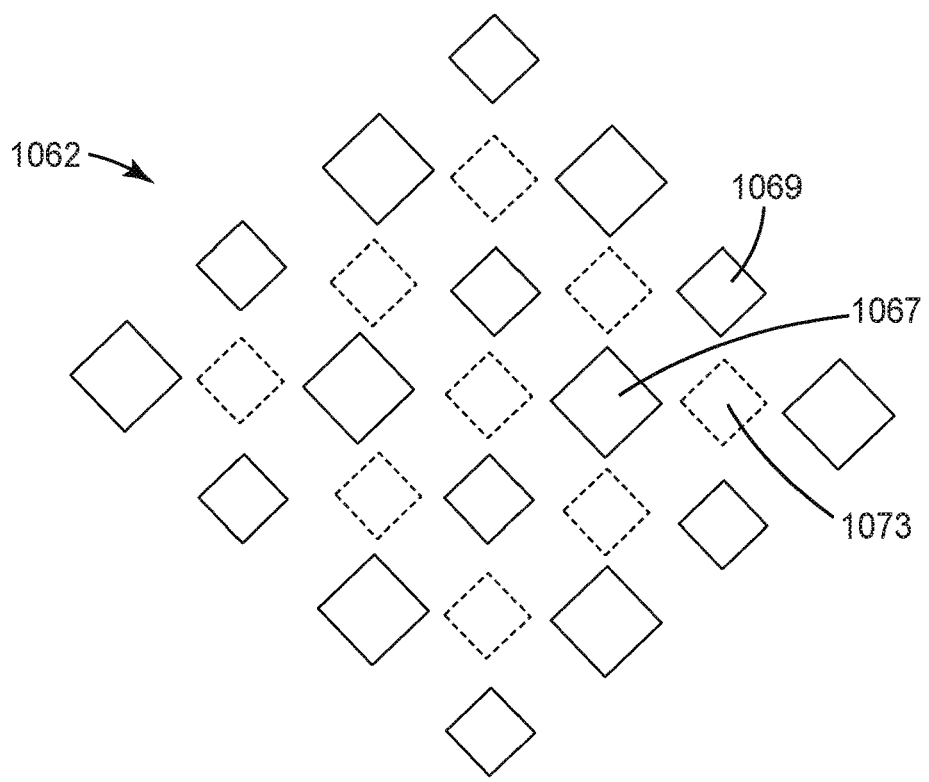

FIGS. 7A-7E illustrate patterns of diffracted light in the imaged gap. FIG. 7A is a schematic top view of a pixel 1045 including a plurality of sub-pixels 1045a-1045d. In some embodiments, sub-pixel 1045a is a red sub-pixel, sub-pixel 1045b is a blue sub-pixel, and sub-pixels 1045c and 1045d are green sub-pixels, for example. FIG. 7B is a schematic top view of an array of the pixel 1045. FIG. 7C is a schematic top view of an imaged array 1062 of the pixel 1045 produced by a structured optical surface. An imaged sub-pixel 1067 is indicated. The structured surface diffracts a portion of the light produced by the sub-pixel producing the imaged sub-pixel 1067 into regions 1073 in the gaps between the imaged sub-pixels. The regions 1073 may have a similar shape and size as the imaged sub-pixel 1067 or the shape and/or size of the regions 1073 may be different from that of the imaged sub-pixel 1067. The different regions 1073 may correspond to different diffraction orders. The pattern of the regions 1073 may reflect a symmetry of the structured optical surface. For example, the illustrated pattern can be produced by a structured optical surface having a 4-fold symmetry. Other sub-pixels will provide light that is diffracted into gaps between the other imaged sub-pixels as schematically illustrated in FIG. 7D.

Figure 7E:
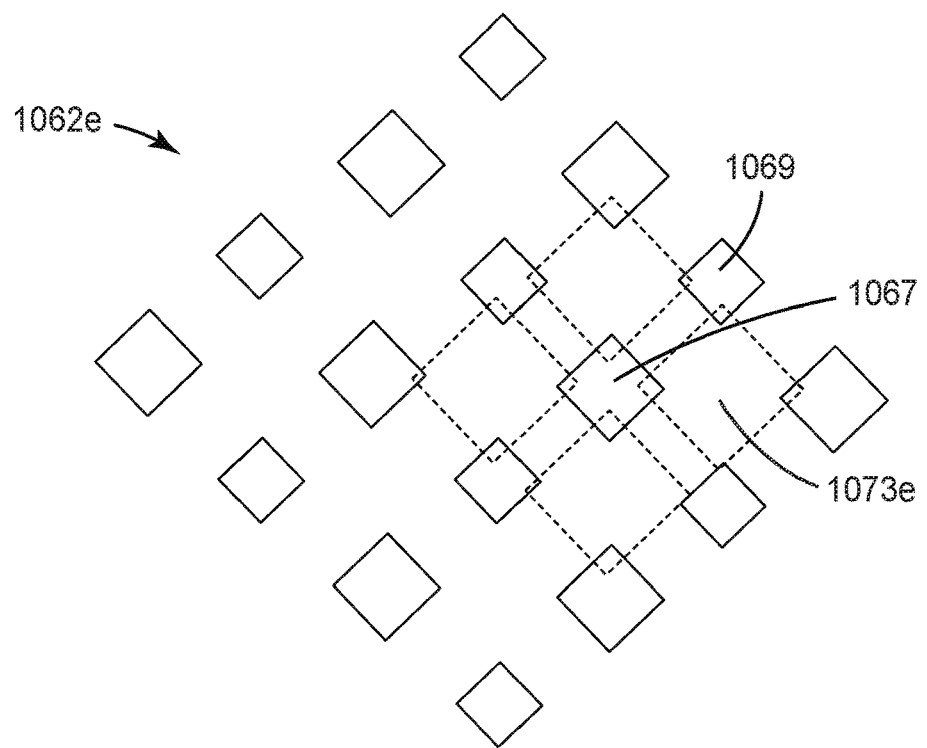

The light diffracted into the gaps between sub-pixels may overlap a sub-pixel to some degree and still be considered to partially fill the imaged gap without substantially overlapping any of the imaged sub-pixels. This is schematically illustrated in FIG. 7E which is a schematic top view of an imaged array 1062e of the pixel 1045 produced by a structured optical surface. The structured surface diffracts a portion of the light produced by the sub-pixel producing the imaged sub-pixel 1067 into regions 1073e in the gaps between the imaged sub-pixels. There is a relatively small portion of the light produced by the sub-pixel producing the imaged sub-pixel 1067 into adjacent sub-pixels. Other sub-pixels will provide light that is diffracted into gaps between the other imaged sub-pixels (see, e.g., FIG. 7D).

Figure 18:
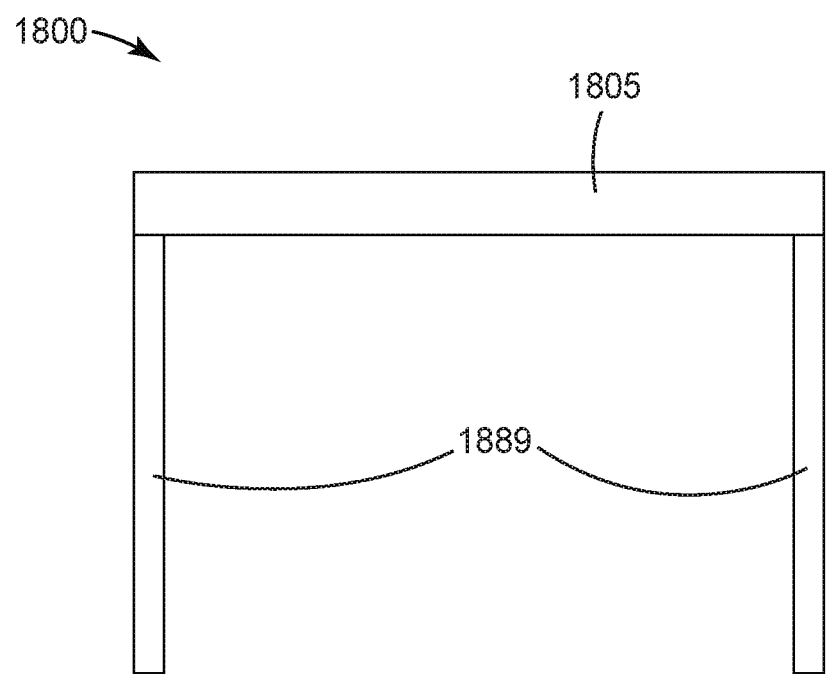
FIG. 18 is a schematic top view of a headset.

Any of the structured optical surfaces described herein may be used in an optical imaging system which may be used in a head-mounted display such as a virtual reality or augmented reality display. FIG. 18 is a schematic top view of a headset 1800 which includes a display portion 1805 and a frame portion 1889 for mounting the headset 1800 on a user's head. The display portion 1805 may include any of the structured optical surfaces or optical imaging systems described elsewhere herein. One or two (e.g., one for each eye) structured optical surfaces and/or optical imaging systems may be included in display portion 1805. In some embodiments, headset 1800 is a virtual reality headset, or an augmented reality headset, or a mixed reality headset, or a headset switchable between different modes which include at least two modes selected from the group consisting of a virtual reality mode, an augmented reality mode, and a mixed reality mode. Useful headset designs are described in U.S. Pat. Appl. Publ. Nos. 2016/0025978 (Mallinson), 2016/0349509 (Lanier et al.), 2016/0353098 (Stein), and 2017/0242262 (Fuchs), for example.

The following is a list of exemplary embodiments of the present description.

Embodiment 1 is a structured optical surface comprising a plurality of three-dimensional structures formed by an intersection of at least first and second Fresnel patterns, such that when the structured optical surface is incorporated in an optical imaging system comprising a pixelated display surface with at least one pixel comprising at least two sub-pixels spaced apart by a gap, the structured optical surface images the at least two sub-pixels onto an image surface as at least two corresponding imaged sub-pixels spaced apart by a corresponding imaged gap, and the structured optical surface diffracts light so that the diffracted light at least partially fills the imaged gap without substantially overlapping any of the at least two imaged sub-pixels.

Embodiment 2 is the structured optical surface of Embodiment 1, wherein the first Fresnel pattern has a first center and the second Fresnel pattern has a second center spaced apart from the first center by a distance in a range from about 1 millimeter to about 20 millimeters.

Embodiment 3 is the structured optical surface of Embodiment 1, wherein at least one three-dimensional structure in the plurality of three-dimensional structures has a maximum lateral dimension in a range from about 10 millimeters to about 100 millimeters.

Embodiment 4 is the structured optical surface of any one of Embodiments 1 to 3 having a focal length in a range from about 10 millimeters to about 100 millimeters.

Embodiment 5 is the structured optical surface of any one of Embodiments 1 to 4, wherein the plurality of the three-dimensional structures is formed by an intersection of between two and sixteen Fresnel patterns.

Embodiment 6 is the structured optical surface of any one of Embodiments 1 to 6 having an n-fold symmetry, $2 \leq n \leq 16$.

Embodiment 7 is the structured optical surface of Embodiment 6, wherein $n \geq 3$.

Embodiment 8 is the structured optical surface of Embodiment 6, wherein $n \leq 4$.

Embodiment 9 is the structured optical surface of Embodiment 6, wherein $n \leq 14$.

Embodiment 10 is the structured optical surface of Embodiment 6, wherein $n \leq 12$.

Embodiment 11 is the structured optical surface of any one of Embodiments 1 to 10, wherein the imaged sub-pixels and the imaged gap are virtual images.

Embodiment 12 is the structured optical surface of any one of Embodiments 1 to 11 having an optical power along orthogonal first and second directions.

Embodiment 13 is the structured optical surface of any one of Embodiments 1 to 12 comprising a focal surface located at focal length of the structured optical surface, the display surface disposed proximate the focal surface.

Embodiment 14 is an optical element comprising the structured optical surface of any one of Embodiments 1 to 13 and an opposing major surface.

Embodiment 15 is the optical element of Embodiment 14, wherein the opposing major surface is substantially planar.

Embodiment 16 is the optical element of Embodiment 14, wherein the opposing major surface is curved.

Embodiment 17 is the optical element of Embodiment 14, wherein the opposing major surface comprises one or more Fresnel patterns.

Embodiment 18 is the structured optical element of any one of Embodiments 14 to 17 being immersed in a resin or an optically clear adhesive.

Embodiment 19 is the structured optical surface of any one of Embodiments 1 to 18 having an n-fold symmetry, $2 \leq n \leq 16$, wherein the plurality of the three-dimensional structures is formed by an intersection of m Fresnel patterns, m n.

Embodiment 20 is the structured optical surface of Embodiment 19, wherein m is greater than n.

Embodiment 21 is the structured optical element of any one of Embodiments 1 to 18, wherein each Fresnel pattern in the at least first and second Fresnel patterns is a same Fresnel pattern.

Embodiment 22 is the structured optical element of any one of Embodiments 1 to 18, wherein at least one Fresnel pattern in the at least first and second Fresnel patterns is different from at least one other Fresnel pattern in the at least first and second Fresnel patterns.

Embodiment 23 is an optical imaging system comprising:
a pixelated display surface for displaying an image and comprising a plurality of pixels comprising a plurality of sub-pixels separated by a plurality of gaps; and
the structured optical surface of any one of Embodiments 1 to 22 disposed proximate the pixelated display surface.

Embodiment 24 is a structured optical surface comprising a plurality of structures, such that for normally incident light having a wavelength in a visible range of the electromagnetic spectrum, the structured optical surface substantially diffracts a first portion of the incident light into a plurality of diffraction orders propagating in a corresponding plurality of different directions, and substantially refracts a different second portion of the incident light so that the substantially refracted light makes an oblique angle with the structured optical surface.

Embodiment 25 is a structured optical surface comprising a plurality of structures, such that for normally incident light having a wavelength in a visible range of the electromagnetic spectrum, the structured optical surface transmits the incident light as transmitted light having a first portion propagating along a plurality of directions not sufficiently described using geometric optics and a second portion propagating in directions sufficiently described using geometric optics, the directions of the second portion making oblique angles with the structured optical surface.

Embodiment 26 is the structured optical surface of Embodiment 24 or 25, wherein the plurality of structures is formed by an intersection of at least first and second Fresnel patterns.

Embodiment 27 is the structured optical surface of Embodiment 26, wherein the plurality of structures is formed by an intersection of between two and sixteen Fresnel patterns.

Embodiment 28 is the structured optical surface of Embodiments 24 to 27 having an n-fold symmetry, $2 \leq n \leq 16$.

Embodiment 29 is an optical imaging system comprising:
a pixelated display surface for displaying an image and comprising a plurality of pixels comprising a plurality of sub-pixels separated by a plurality of gaps; and
the structured optical surface of any one of Embodiments 24 to 28 disposed proximate the pixelated display surface.

Embodiment 30 is an optical imaging system comprising:
a pixelated display surface for displaying an image and comprising a plurality of pixels comprising a plurality of sub-pixels separated by a plurality of gaps; and
a hybrid refractive and diffractive optical surface imaging the pluralities of sub-pixels and the gaps onto an image surface of the optical imaging system as a plurality of imaged sub-pixels separated by a plurality of imaged gaps, and diffracting light from the display surface so that the diffracted light at least partially fills the plurality of imaged gaps without substantially overlapping any of the imaged sub-pixels.

Embodiment 31 is the optical imaging system of Embodiment 30, wherein the hybrid refractive and diffractive optical surface comprises a plurality of three-dimensional structures formed by an intersection of at least first and second Fresnel patterns.

Embodiment 32 is the optical imaging system of Embodiment 31, wherein the plurality of the three-dimensional structures is formed by an intersection of between two and sixteen Fresnel patterns.

Embodiment 33 is the optical imaging system of any one of Embodiments 30 to 32, wherein the hybrid refractive and diffractive optical surface has an n-fold symmetry, $2 \leq n \leq 16$.

Embodiment 34 is a headset comprising the optical imaging system of any one of Embodiments 23 or 29 to 33.

Embodiment 35 is the headset of Embodiment 34 being at least one of a virtual reality headset, an augmented reality headset, or a mixed reality headset.

EXAMPLES

Figure 8:
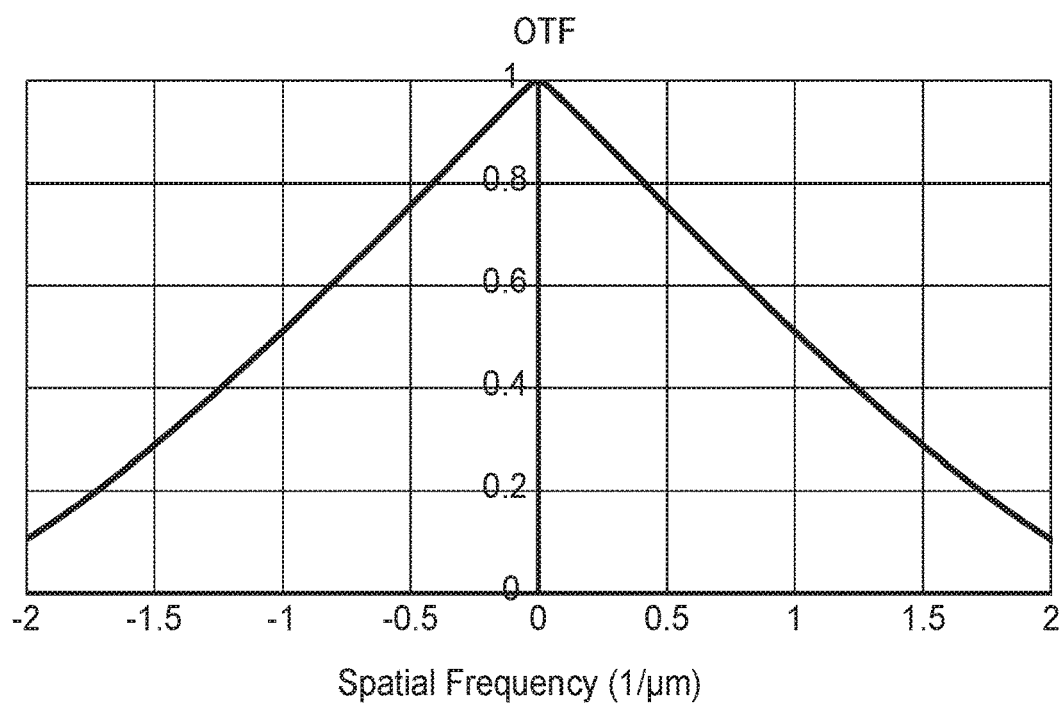
FIG. 8 is a plot of the optical transfer function of an imaging lens in an optical imaging system.
Figure 9:
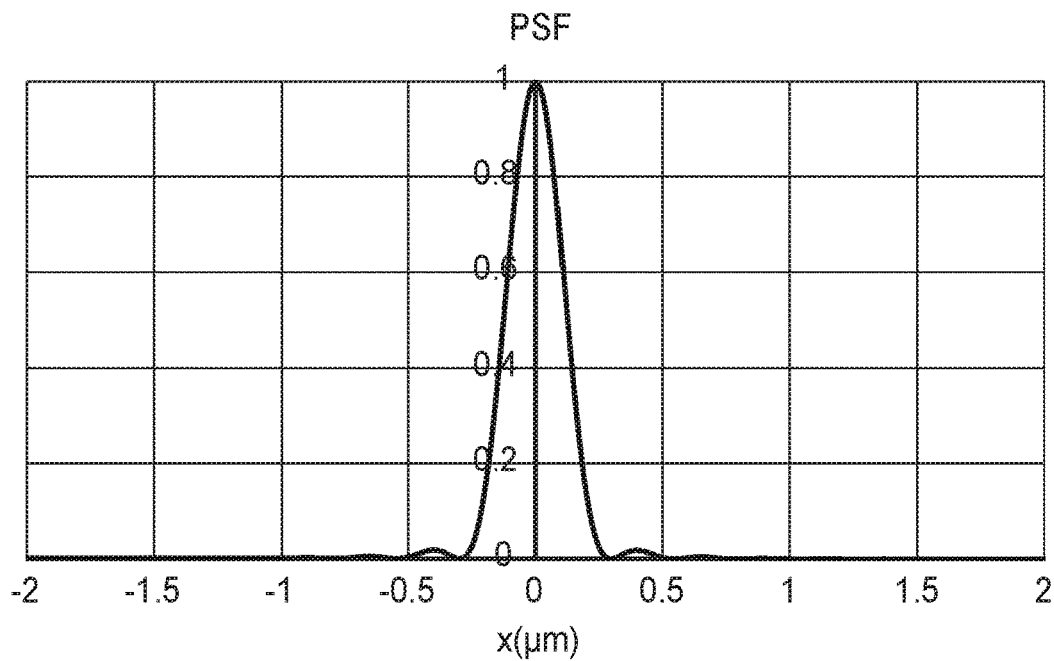
FIG. 9 is a plot of the point spread function of an imaging lens in an optical imaging system.

An optical imaging system including a pixelated display panel and an imaging lens with a 50 mm diameter and 40 mm focal length with a structured optical surface disposed adjacent to the optical lens and facing the display panel was modeled using scalar diffraction. The structured optical surface included a plurality of three-dimensional structures formed by an intersection of 2 to 16 Fresnel patterns. The optical transfer function (OTF) and the point spread function (PSF) for the imaging lens without the structured optical surface are shown in FIGS. 8-9.

Figure 10:
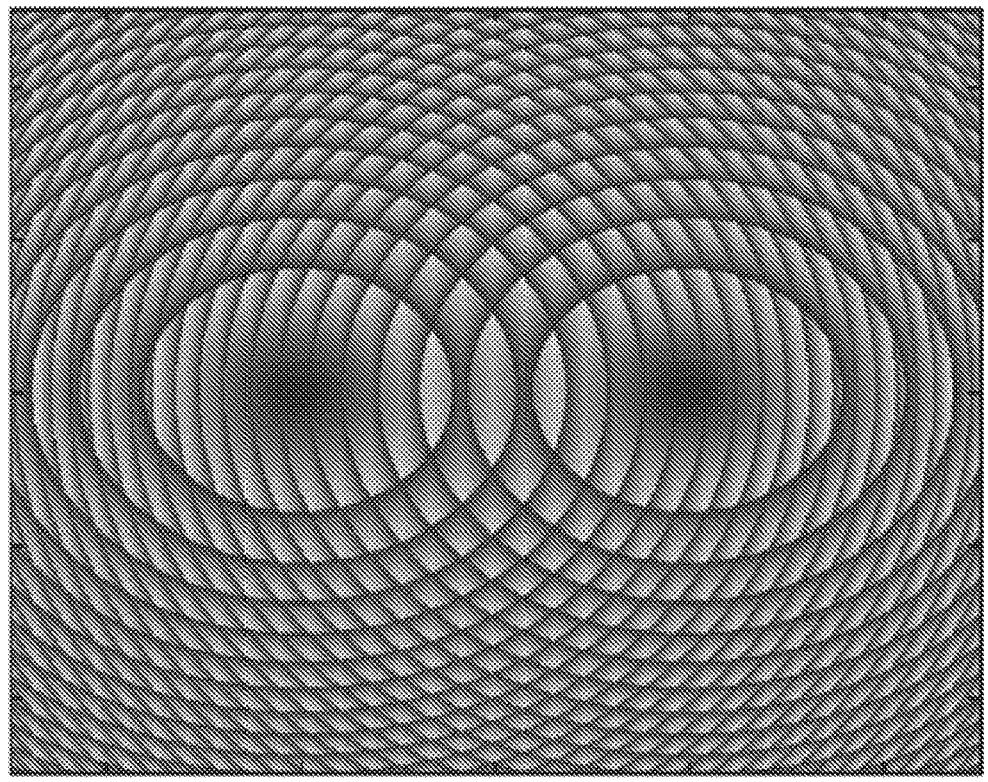
FIG. 10 is a top view of a structured optical surface including structures formed by the intersection of two Fresnel patterns.
Figure 11:
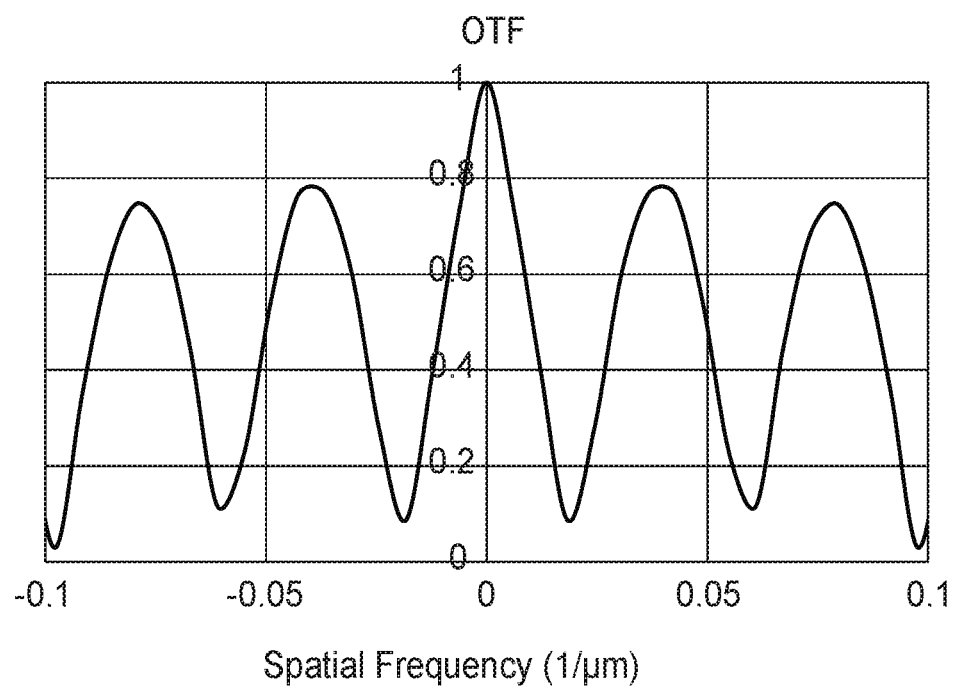
FIG. 11 is a plot of the optical transfer function of the structured optical surface of FIG. 10 in an optical imaging system.
Figure 12:
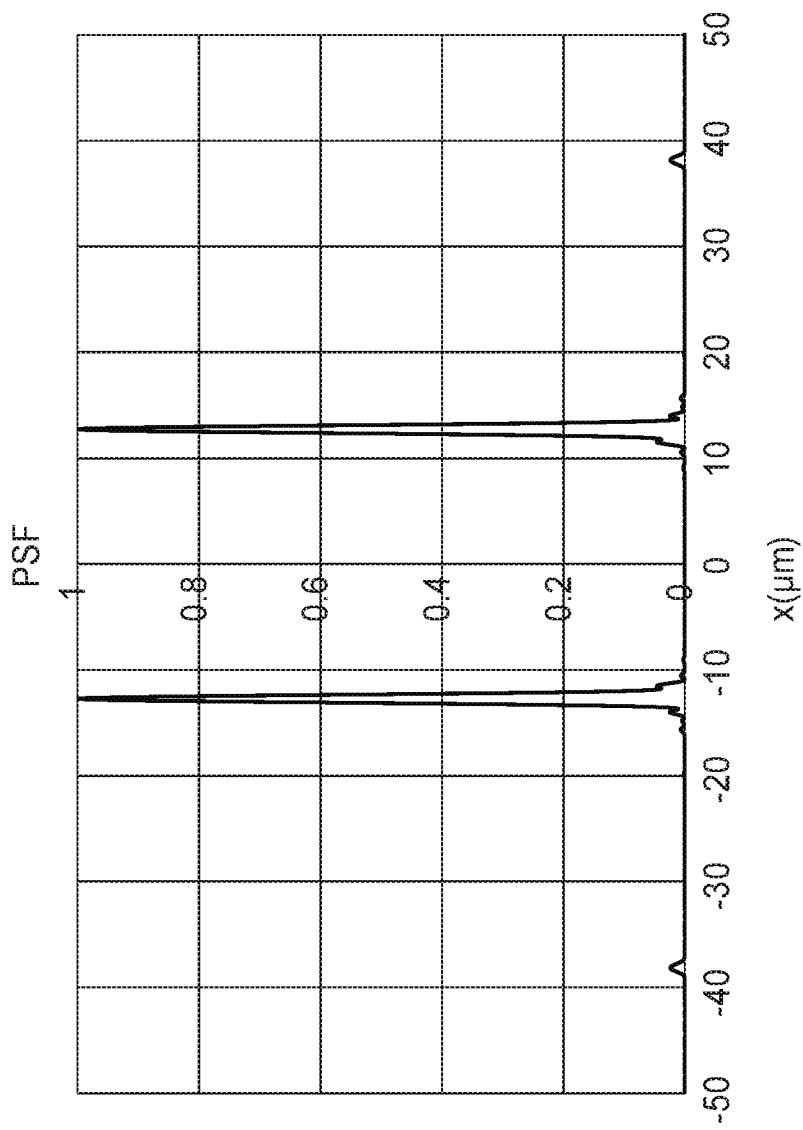
FIG. 12 is a plot of the point spread function of the structured optical surface of FIG. 10 in an optical imaging system.

A top view of a structured optical surface including three-dimensional structures formed by an intersection of 2 Fresnel patterns and having a 2-fold symmetry is illustrated in FIG. 10. The OTF and the PSF in a cross-section along an x-direction for this structured optical surface in the optical imaging system with the imaging lens are shown in FIGS. 11-12. The PSF exhibited two peaks, both of which are visible in the cross-section of FIG. 12.

Figure 13:
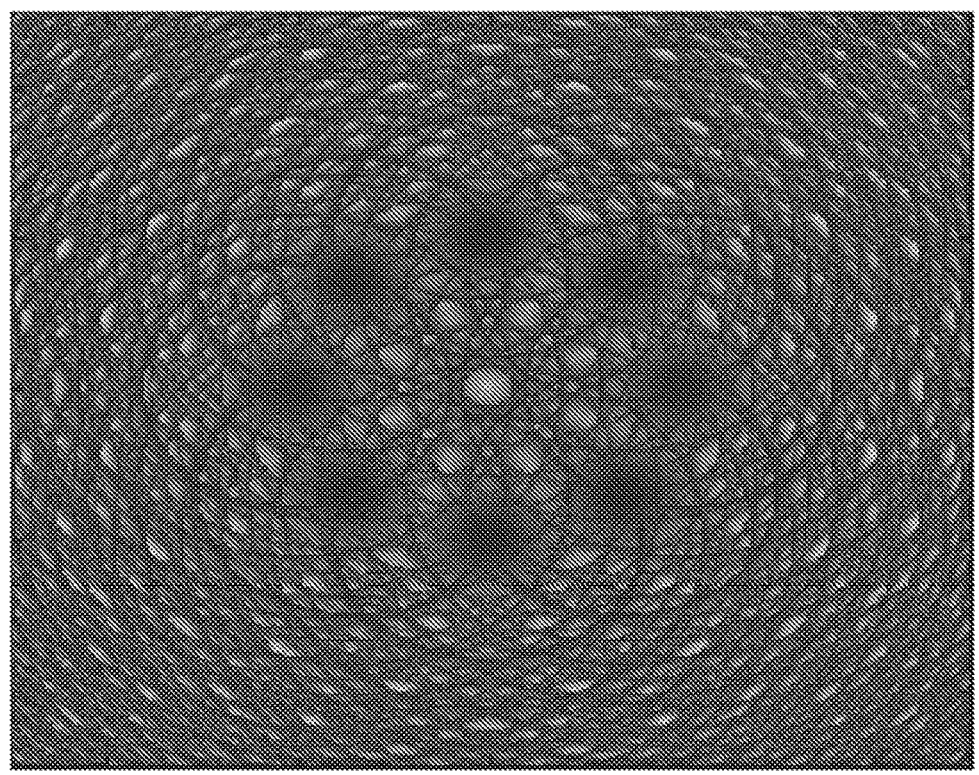
FIG. 13 is a top view of a structured optical surface including structures formed by the intersection of eight Fresnel patterns.
Figure 14:
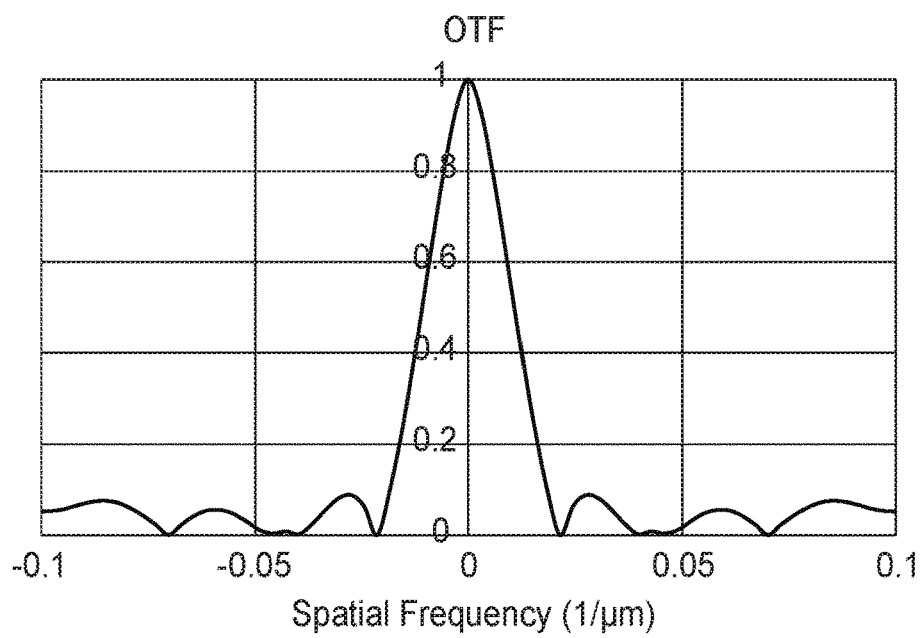
FIG. 14 is a plot of the optical transfer function of the structured optical surface of FIG. 13 in an optical imaging system.
Figure 15:
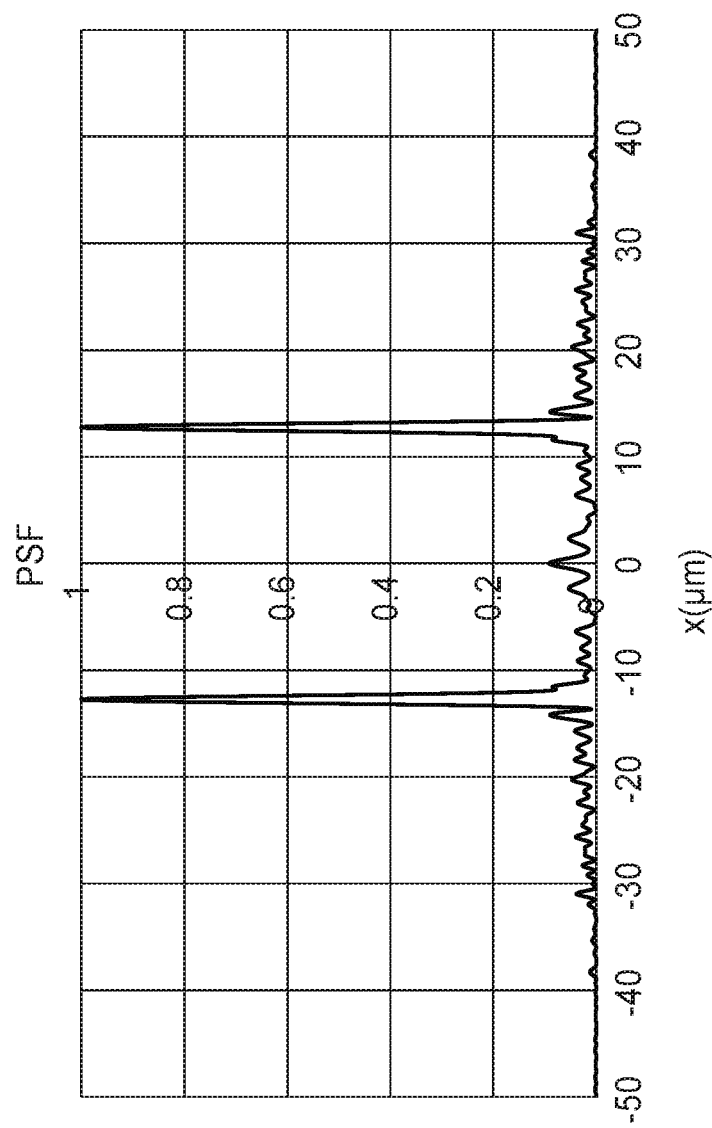
FIG. 15 is a plot of the point spread function of the structured optical surface of FIG. 13 in an optical imaging system.

A top view of a structured optical surface including three-dimensional structures formed by an intersection of 8 Fresnel patterns and having an 8-fold symmetry is illustrated in FIG. 13. The OTF and the PSF in a cross-section along the x-direction for this structured optical surface in the optical imaging system with the imaging lens are shown in FIGS. 14-15. The PSF exhibited eight peaks arranged approximately around a circle. Two of these peaks are visible in the cross-section of FIG. 15.

Figure 16:
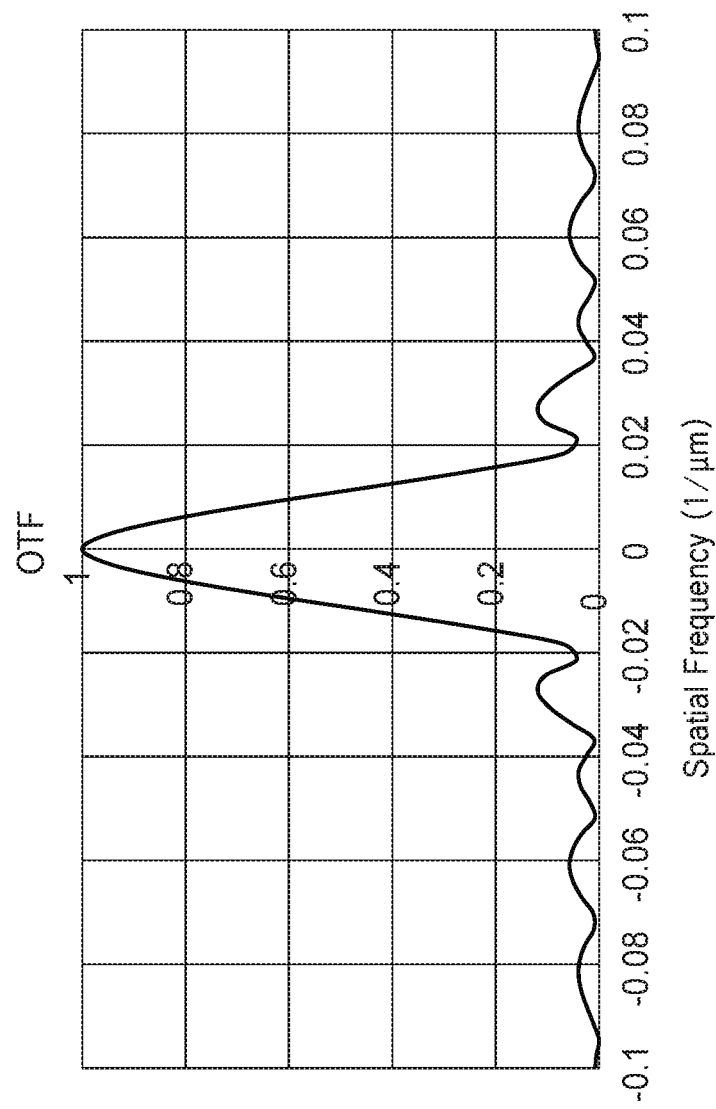
FIG. 16 is a plot of the optical transfer function of a structured optical surface in an optical imaging system where the structured optical surface includes structures formed by the intersection of sixteen Fresnel patterns.
Figure 17:
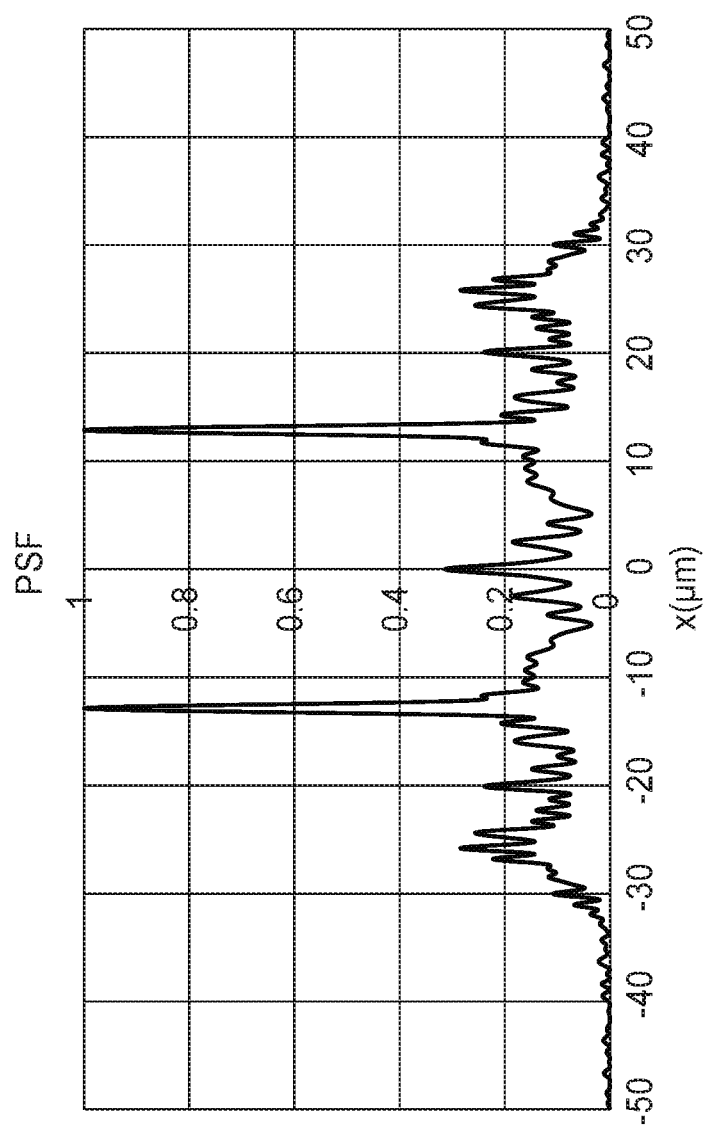
FIG. 17 is a plot of the point spread function of a structured optical surface in an optical imaging system where the structured optical surface includes structures formed by the intersection of sixteen Fresnel patterns.

The optical imaging system including a structured optical surface including three-dimensional structures formed by an intersection of 16 Fresnel patterns and having a 16-fold symmetry was modeled. The OTF and the PSF in a cross-section along the x-direction for this structured optical surface in the optical imaging system with the imaging lens are shown in FIGS. 16-17. The PSF exhibited 16 peaks arranged approximately around a circle. Two of these peaks are visible in the cross-section of FIG. 17.

The screen-door effect index was determined as described elsewhere herein for structured optical surfaces having three-dimensional structures formed by an intersection of 2, 4, 8 and 16 intersecting Fresnel patterns. The results are reported in Table 1.

TABLE 1

| Rotational symmetry | SDE Index |
| --- | --- |
| Original imaging system without structured optical surface | 7.4 |
| 2-fold | 2.1 |
| 4-fold | 0.47 |
| 8-fold | 0.47 |
| 16-fold | 0.35 |

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A structured optical surface comprising a plurality of three-dimensional structures formed by an intersection of at least first and second Fresnel patterns, such that when the structured optical surface is incorporated in an optical imaging system comprising a pixelated display surface with at least one pixel comprising at least two sub-pixels spaced apart by a gap, the structured optical surface images the at least two sub-pixels onto an image surface as at least two corresponding imaged sub-pixels spaced apart by a corresponding imaged gap, and the structured optical surface diffracts light so that the diffracted light at least partially fills the imaged gap without substantially overlapping any of the at least two imaged sub-pixels, wherein the structured optical surface has a focal length in a range from about 10 millimeters to about 100 millimeters.

2. The structured optical surface of claim 1, wherein the first Fresnel pattern has a first center and the second Fresnel pattern has a second center spaced apart from the first center by a distance in a range from about 1 millimeter to about 20 millimeters.

3. The structured optical surface of claim 1, wherein the plurality of the three-dimensional structures is formed by an intersection of between two and sixteen Fresnel patterns.

4. The structured optical surface of claim 1, wherein the imaged sub-pixels and the imaged gap are virtual images.

5. The structured optical surface of claim 1 comprising a focal surface located at focal length of the structured optical surface, the display surface disposed proximate the focal surface.

6. The structured optical surface of claim 1 having an n-fold symmetry, $2 \leq n \leq 16$, wherein the plurality of the three-dimensional structures is formed by an intersection of m Fresnel patterns, $m \geq n$.

7. The structured optical surface of claim 6, wherein m is greater than n.

8. An optical imaging system comprising:
a pixelated display surface for displaying an image and comprising a plurality of pixels comprising a plurality of sub-pixels separated by a plurality of gaps; and
a hybrid refractive and diffractive optical surface imaging the pluralities of sub-pixels and the gaps onto an image surface of the optical imaging system as a plurality of imaged sub-pixels separated by a plurality of imaged gaps, and diffracting light from the display surface so that the diffracted light at least partially fills the plurality of imaged gaps without substantially overlapping any of the imaged sub-pixels.

9. The optical imaging system of claim 8, wherein the hybrid refractive and diffractive optical surface comprises a plurality of three-dimensional structures formed by an intersection of at least first and second Fresnel patterns.

10. The optical imaging system of claim 8, wherein the hybrid refractive and diffractive optical surface has an n-fold symmetry, $2 \le n \le 16$.

11. A headset comprising the optical imaging system of claim 8.

12. A structured optical surface comprising a plurality of three-dimensional structures formed by an intersection of at least first and second Fresnel patterns, such that when the structured optical surface is incorporated in an optical imaging system comprising a pixelated display surface with at least one pixel comprising at least two sub-pixels spaced apart by a gap, the structured optical surface images the at least two sub-pixels onto an image surface as at least two corresponding imaged sub-pixels spaced apart by a corresponding imaged gap, and the structured optical surface diffracts light so that the diffracted light at least partially fills the imaged gap without substantially overlapping any of the at least two imaged sub-pixels, wherein the first Fresnel pattern has a first center and the second Fresnel pattern has a second center spaced apart from the first center by a distance in a range from about 1 millimeter to about 20 millimeters.

13. The structured optical surface of claim 12, wherein the plurality of the three-dimensional structures is formed by an intersection of between two and sixteen Fresnel patterns.

14. The structured optical surface of claim 12, wherein the imaged sub-pixels and the imaged gap are virtual images.

15. The structured optical surface of claim 12 comprising a focal surface located at focal length of the structured optical surface, the display surface disposed proximate the focal surface.

16. The structured optical surface of claim 12 having an n-fold symmetry, $2 \le n \le 16$, wherein the plurality of the three-dimensional structures is formed by an intersection of m Fresnel patterns, $m \ge n$.

17. The structured optical surface of claim 16, wherein m is greater than n.

* * * * *